US011962398B2

(12) United States Patent
Abedini et al.

(10) Patent No.: US 11,962,398 B2
(45) Date of Patent: Apr. 16, 2024

(54) PROGRAMMABLE SMART REPEATER WITH IN-BAND CONTROL

(71) Applicant: QUALCOMM Incorporated, San Diego, CA (US)

(72) Inventors: Navid Abedini, Basking Ridge, NJ (US); Wanshi Chen, San Diego, CA (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 39 days.

(21) Appl. No.: 17/468,010

(22) Filed: Sep. 7, 2021

(65) Prior Publication Data

US 2022/0103247 A1 Mar. 31, 2022

Related U.S. Application Data

(60) Provisional application No. 63/085,998, filed on Sep. 30, 2020.

(51) Int. Cl.
*H04B 7/204* (2006.01)
*H04B 7/06* (2006.01)
(Continued)

(52) U.S. Cl.
CPC ......... *H04B 7/2046* (2013.01); *H04B 7/0695* (2013.01); *H04B 7/2041* (2013.01);
(Continued)

(58) Field of Classification Search
CPC ............. H04W 72/0473; H04W 72/02; H04W 72/044; H04W 72/0446; H04W 72/0453;
(Continued)

(56) References Cited

U.S. PATENT DOCUMENTS

2008/0031174 A1* 2/2008 Saifullah ........... H04W 52/0219
455/15
2013/0095747 A1* 4/2013 Moshfeghi ........ H04W 72/0453
455/7
(Continued)

FOREIGN PATENT DOCUMENTS

CA 2911649 C * 11/2018 ........ H04W 36/0072
EP 2782263 A1 9/2014
(Continued)

OTHER PUBLICATIONS

International Search Report and Written Opinion—PCT/US2021/049514—ISA/EPO—dated Dec. 10, 2021.

*Primary Examiner* — Phong La
(74) *Attorney, Agent, or Firm* — Procopio, Cory, Hargreaves & Savitch LLP

(57) ABSTRACT

Apparatus, methods, and computer-readable media for facilitating a programmable smart repeater with in-band control are disclosed herein. An example method for wireless communication at a repeater includes establishing a control link with a control node and receiving, via the control link, a configuration of one or more parameters of the repeater to forward communication between a first wireless device and a second wireless device. The example method also includes transitioning an MT component of the repeater to a power saving mode for at least a period of time after receiving the configuration and forwarding the communication between the first wireless device and the second wireless device based on the one or more parameters in the configuration. The disclosed techniques may enable reduction in control signaling between the control node and the repeater to provide power savings for the MT of the repeater and lower signal overhead for the control node.

31 Claims, 14 Drawing Sheets

(51) Int. Cl.
*H04W 52/02* (2009.01)
*H04W 56/00* (2009.01)
*H04W 72/044* (2023.01)
*H04L 5/14* (2006.01)

(52) U.S. Cl.
CPC ... *H04W 52/0235* (2013.01); *H04W 56/0005* (2013.01); *H04W 72/0473* (2013.01); *H04L 5/14* (2013.01)

(58) Field of Classification Search
CPC ......... H04W 72/0406; H04W 52/0235; H04W 52/0225; H04W 52/029; H04W 52/0251; H04W 52/0005; H04W 52/001; H04L 5/14; H04L 5/1438; H04L 5/22; H04B 7/2041; H04B 7/204; H04B 7/2046; H04B 7/2045; H04B 7/2043; H04B 7/208; H04B 7/2012; H04B 7/0695; H04B 7/0686; H04B 7/0691
See application file for complete search history.

(56) References Cited

U.S. PATENT DOCUMENTS

| | | | | |
|---|---|---|---|---|
| 2015/0358907 | A1* | 12/2015 | Berggren | H04W 52/0235 455/574 |
| 2018/0234862 | A1 | 8/2018 | Lee et al. | |
| 2019/0261294 | A1* | 8/2019 | Gupta | H04W 56/001 |
| 2021/0044412 | A1* | 2/2021 | Li | H04W 80/02 |
| 2021/0064445 | A1* | 3/2021 | Minehan | G06F 9/4893 |
| 2022/0103247 | A1* | 3/2022 | Abedini | H04B 7/2041 |
| 2022/0248399 | A1* | 8/2022 | You | H04W 84/04 |
| 2022/0393844 | A1* | 12/2022 | Ohara | H04L 5/001 |
| 2022/0394508 | A1* | 12/2022 | Kim | H04W 24/02 |

FOREIGN PATENT DOCUMENTS

| | | | | |
|---|---|---|---|---|
| EP | 4087330 | A1 * | 11/2022 | ............ H04W 24/08 |
| WO | WO-2017052596 | A1 * | 3/2017 | ................ H04B 1/04 |
| WO | 2019190637 | A1 | 10/2019 | |
| WO | WO-2022113809 | A1 * | 6/2022 | |

* cited by examiner

PROGRAMMABLE SMART REPEATER WITH IN-BAND CONTROL

CROSS REFERENCE TO RELATED APPLICATION(S)

This application claims the benefit of and priority to U.S. Provisional Application Ser. No. 63/085,998, entitled "PROGRAMMABLE SMART REPEATER WITH IN-BAND CONTROL," and filed on Sep. 30, 2020, which is expressly incorporated by reference herein in its entirety.

TECHNICAL FIELD

The present disclosure relates generally to communication systems, and more particularly, to wireless communication using an analog repeater.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a repeater. An example apparatus may establish a control link with a control node. The example apparatus may also receive, via the control link, a configuration of one or more parameters of the repeater to forward communication between a first wireless device and a second wireless device. Additionally, the example apparatus may transition a mobile termination (MT) component of the repeater to a power saving mode for at least a period of time after receiving the configuration. The example apparatus may also forward the communication between the first wireless device and the second wireless device based on the one or more parameters in the configuration.

In another aspect of the disclosure, a method, a computer-readable medium, and an apparatus are provided for wireless communication at a control node. An example apparatus may establish a control link with a repeater. The example apparatus may also transmit, via the control link, a configuration of one or more parameters of the repeater to forward communication between a first wireless device and a second wireless device. Additionally, the example apparatus may transmit, to the repeater, an indication for a MT component to enter a power saving mode.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
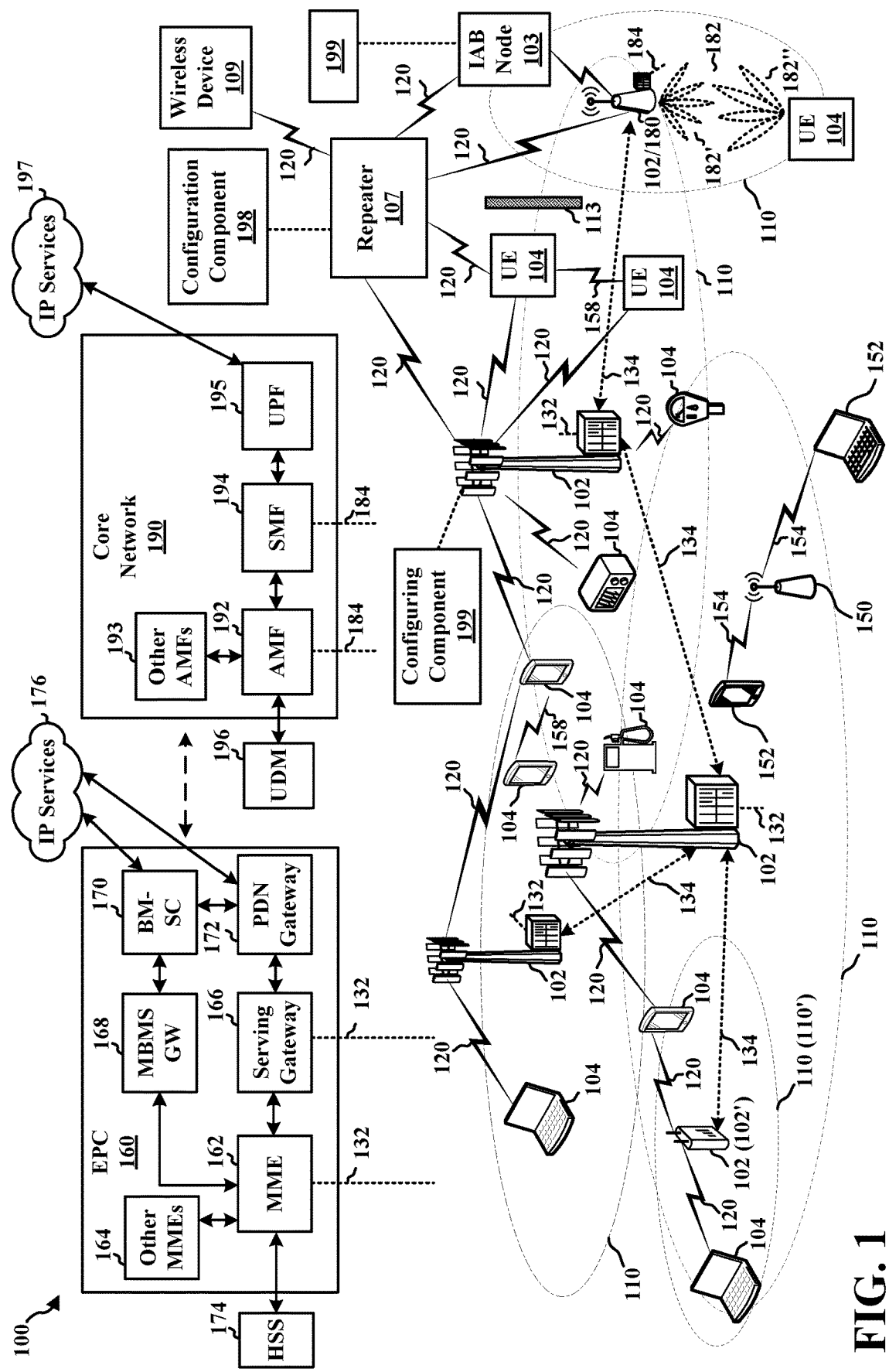
FIG. 1 is a diagram illustrating an example of a wireless communications system and an access network.

In certain situations, direct communication between a first wireless device and a second wireless device may be difficult because there is a blockage between the devices or because the second wireless device is out of range of the first wireless device. In such scenarios, a repeater device may be configured to extend the coverage of the second wireless device by amplifying the signals transmitted between the first wireless device and the second wireless device.

In some examples, the repeater may be dynamically controlled by a control node so that a configuration of the repeater can be dynamically adjusted or reconfigured depending on the conditions of the communication system. As an example, the controller may dynamically configure the repeater based on conditions experienced by one or more of the first wireless device, the second wireless device, and the repeater. However, in some scenarios, dynamic control of the repeater device by the control node may utilize additional power and/or signaling overhead.

Aspects disclosed herein provide techniques for improving power saving at a repeater and/or lower signaling overhead of the control node based on signaling from a control node. For example, aspects disclosed herein provide techniques that may enable a reduction in the dynamic control signaling between the control node and the repeater to provide power savings for the MT of the repeater and to the lower signal overhead for the control node.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100 including base stations 102 and 180 and UEs 104. The example of the wireless communications system (also referred to as a wireless wide area network (WWAN)) includes the base stations 102, 180, the UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The wireless communication system of FIG. 1 may further include integrated access and backhaul (IAB) nodes 103 and repeaters 107 that forward communication between a first wireless device (e.g., any of the base stations 102, 180, the UEs 104, the IAB node 103, an additional repeater, etc.) and a second wireless device 109. The second wireless device 109 may be a base station, a UE, an IAB node, an additional repeater, etc. The repeater 107 may be an analog repeater that receives, amplifies, and forwards a signal between the wireless devices over communication links 120. As an example, the repeater 107 may provide additional coverage for a transmitting device that may have a signal to a receiver at least partially blocked by a blockage 113. One of the wireless devices may be a control node for the repeater 107. The repeater 107 may include an MT component that receives control signaling from a control node (e.g., the base station 102, 180 or the IAB node 103) and a repeating unit (RU) that forwards the communication based on the control signaling received from the control node. In some examples, the RU may be referred to as a remote unit. In some examples, the repeater may be referred to as a pass-through repeater.

As described herein, the control node may include the base station 102, 180, the IAB node 103, etc. The first wireless device may include the base station 102, 180, the IAB node 103, the UE 104, or another repeater. The second wireless device may include the base station 102, 180, the IAB node 103, the UE 104, or another repeater.

Referring again to FIG. 1, in certain aspects, the repeater 107 may include a configuration component 198 that uses a control link to: (1) integrate the repeater 107 and share its capabilities, (2) define new control messages to configure an RU operation, (3) define a beamforming configuration, (4) establish a transmit power configuration and configurable operating bandwidth, and/or (5) perform time-domain resource allocation. For example, the configuration component 198 may be configured to establish a control link with a control node. The example configuration component 198 may also be configured to receive, via the control link, a configuration of one or more parameters of the repeater to forward communication between a first wireless device and a second wireless device. Additionally, the example configuration component 198 may be configured to transition an MT component of the repeater to a power saving mode for at least a period of time after receiving the configuration. The example configuration component 198 may also be configured to forward the communication between the first wireless device and the second wireless device based on the one or more parameters in the configuration.

In another configuration, a control node, such as the base stations 102, 180 or the IAB node 103, may be configured to manage or more aspects of wireless communication by facilitating signaling of configurations to the repeater 107. For example, the control node may include a configuring component 199 configured to establish a control link with a repeater. The example configuring component 199 may also be configured to transmit, via the control link, a configuration of one or more parameters of the repeater to forward communication between a first wireless device and a second wireless device. Additionally, the example configuring component 199 may be configured to transmit, to the repeater, an indication for an MT component to enter a power saving mode.

The aspects presented herein may enable improving power saving at a repeater and/or lowering signaling overhead of the control node based on signaling from a control node.

Although the following description may be focused on 5G NR, the concepts described herein may be applicable to other similar areas, such as LTE, LTE-A, CDMA, GSM, and other wireless technologies.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Figure 2:
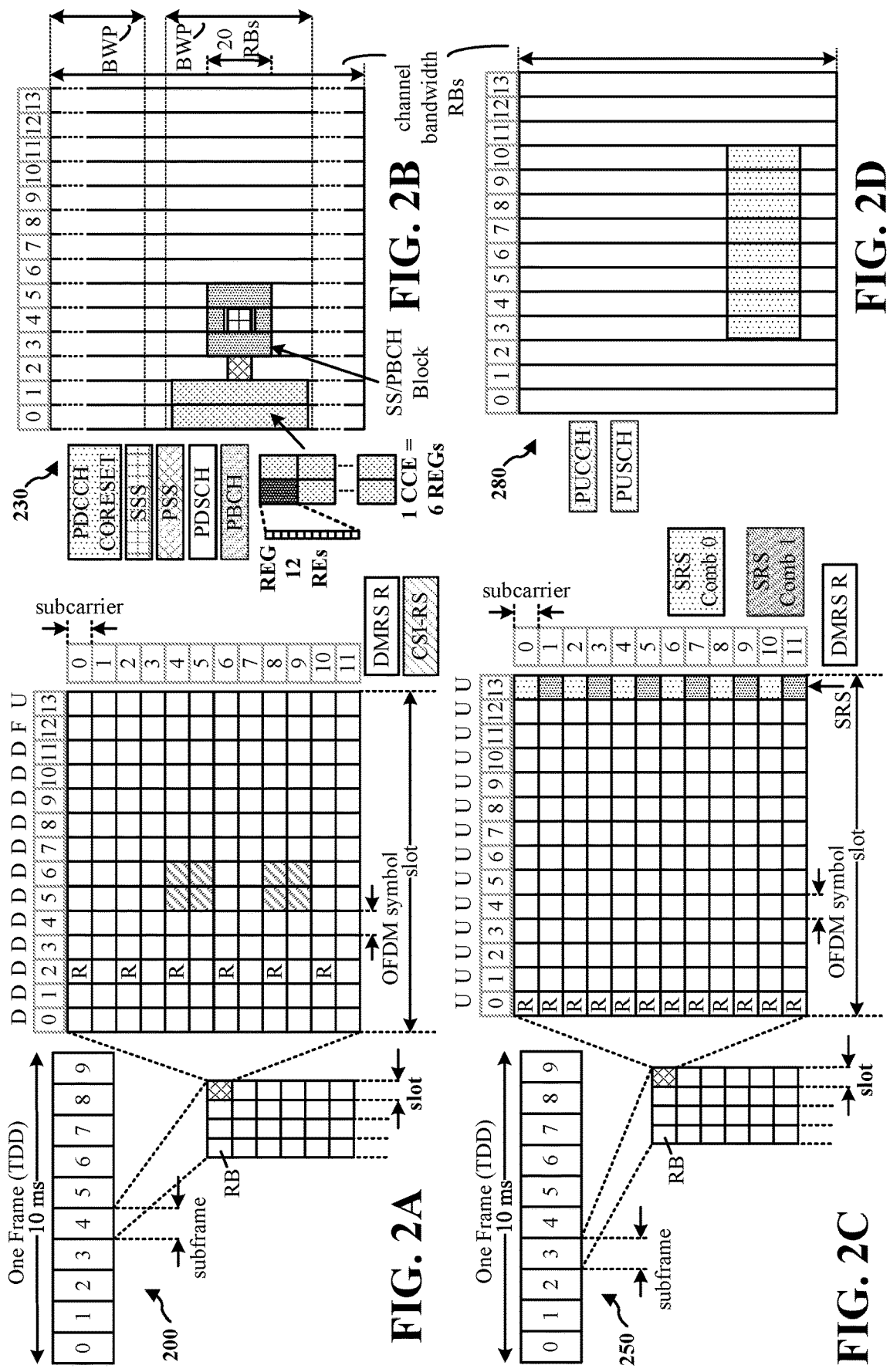
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu t=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB)

(also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
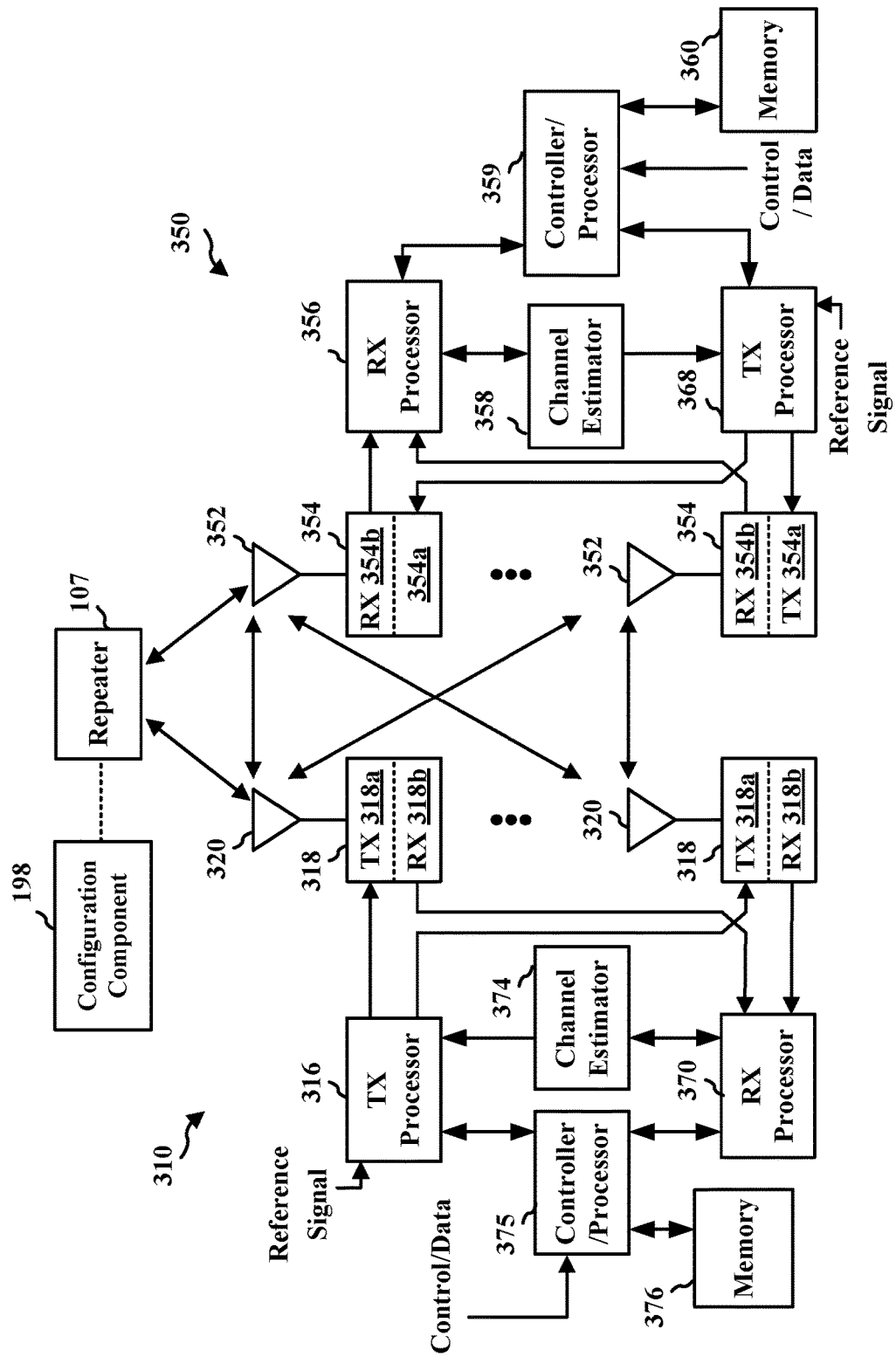
FIG. 3 is a diagram illustrating an example of a base station and a user equipment (UE) in an access network.

FIG. 3 is a block diagram that illustrates an example of a first wireless device that is configured to exchange wireless communication with a second wireless device. In the illustrated example, the first wireless device may include a base station 310, the second wireless device may include a UE 350, and the base station 310 may be in communication with the UE 350 in an access network. In some examples, the repeater 107 may amplify and/or forward communication between the base station 310 and the UE 350. In some examples, the repeater 107 may amplify and forward wireless communication between different devices, e.g., including IAB nodes or other repeaters in addition to the examples with UEs and base stations. In one aspect, the repeater 107 may include a configuration component 198 that uses a control link to, for example: (1) integrate the repeater 107 and share its capabilities, (2) define new control messages to configure an RU operation, (3) define a beamforming configuration, (4) establish a transmit power configuration and configurable operating bandwidth, and (5) perform time-domain resource allocation.

As shown in FIG. 3, the base station 310 includes a transmit processor (TX processor 316), a transceiver 318 including a transmitter 318a and a receiver 318b, antennas 320, a receive processor (RX processor 370), a channel estimator 374, a controller/processor 375, and memory 376. The example UE 350 includes antennas 352, a transceiver 354 including a transmitter 354a and a receiver 354b, an RX processor 356, a channel estimator 358, a controller/processor 359, memory 360, and a TX processor 368. In other examples, the base station 310 and/or the UE 350 may include additional or alternative components.

In the DL, IP packets from the EPC 160 may be provided to the controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The TX processor 316 and the RX processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from the channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318*a*. Each transmitter 318*a* may modulate a radio frequency (RF) carrier with a respective spatial stream for transmission.

At the UE 350, each receiver 354*b* receives a signal through its respective antenna 352. Each receiver 354*b* recovers information modulated onto an RF carrier and provides the information to the RX processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with the memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354*a*. Each transmitter 354*a* may modulate an RF carrier with a respective spatial stream for transmission.

The UL transmission is processed at the base station 310 in a manner similar to that described in connection with the receiver function at the UE 350. Each receiver 318*b* receives a signal through its respective antenna 320. Each receiver 318*b* recovers information modulated onto an RF carrier and provides the information to the RX processor 370.

The controller/processor 375 can be associated with the memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
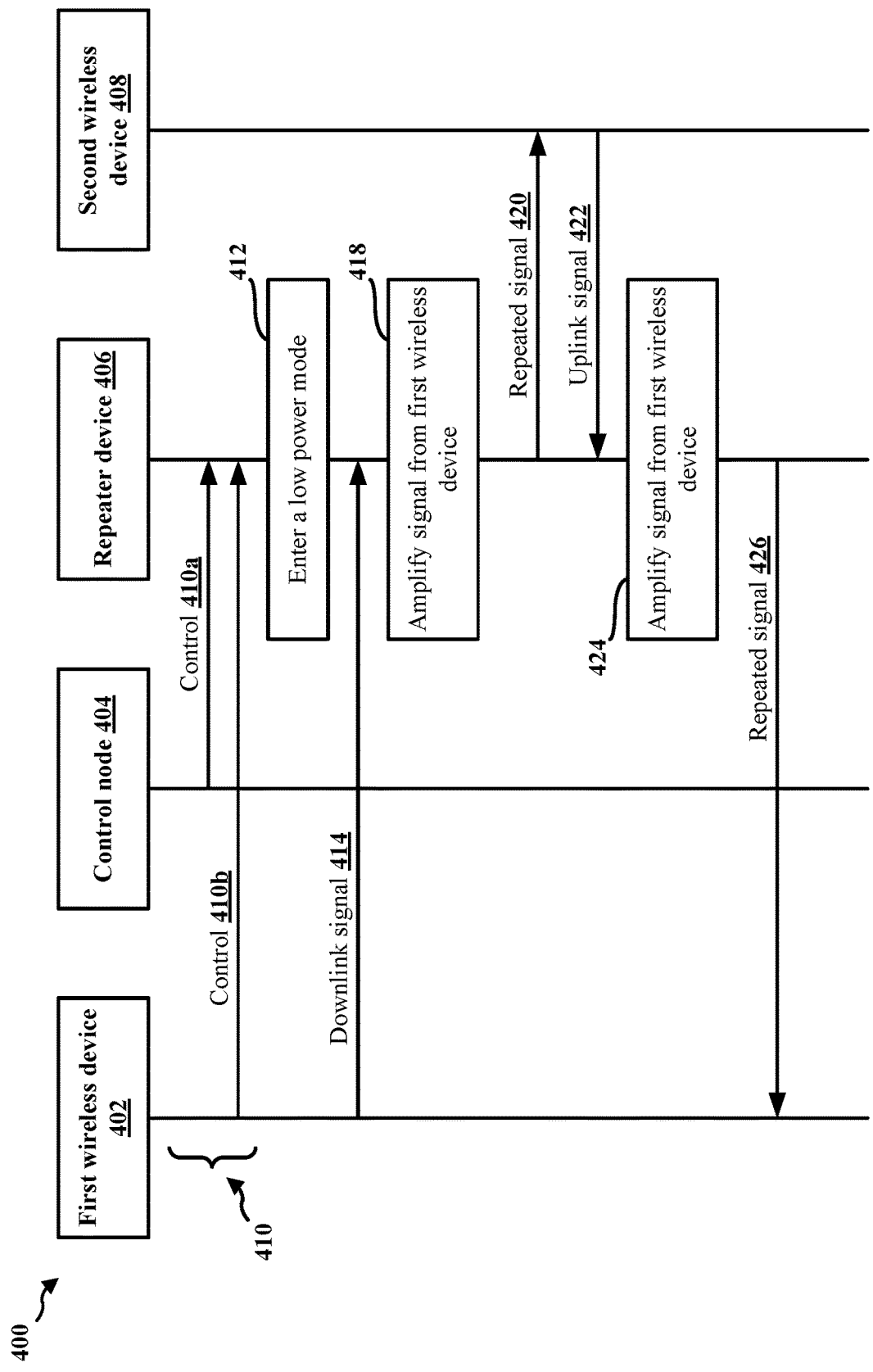
FIG. 4 illustrates an example communication flow between a first wireless device and a second wireless device through a repeater device within a communication system, in accordance with various aspects of the present disclosure.

FIG. 4 illustrates an example communication flow 400 between a first wireless device 402 and a second wireless device 408 through a repeater device 406 within a communication system, as presented herein. In one aspect, the first wireless device 402 may be implemented by a base station, while the second wireless device 408 may be implemented by a UE. In other examples, the first wireless device 402 may be implemented by an IAB node, a UE, or another repeater. Similarly, the second wireless device 408 may be implemented by a base station, an IAB node, or another repeater. In certain situations, direct communication between the first wireless device 402 and the second wireless device 408 may be difficult because there is a blockage or the second wireless device 408 is out of range of the first wireless device 402. Thus, the repeater device 406 may be configured to extend the coverage of the second wireless device 408 by amplifying the signals transmitted between the wireless devices 402, 408.

In some examples, the repeater device 406 may be controlled by a control node 404 so that the configuration of the repeater device 406 can be adjusted or reconfigured (statically or dynamically) depending on the conditions (e.g., internal conditions, external conditions, and/or environmental conditions) of the communication system including the first wireless device 402, the second wireless device 408, and the repeater device 406. For example, control signaling 410 may be used to reconfigure the beamforming procedures of the repeater device 406 based on the conditions. In some examples, the control signaling 410 may include first control signal 410a from the control node 404 to the repeater device 406. In some examples, the control signaling 410 may include second control signal 410b from the first wireless device 402 to the repeater device 406. In one aspect, the control node 404 may reside within the first wireless device 402. In such examples, the first wireless device 402 may transmit the second control signal 410b to the repeater device 406. In other examples, the control node 404 may be a separate device than the first wireless device 402. For example, the control node 404 may transmit the first control signal 410a that is received by the repeater device 406.

The control signaling 410 (e.g., the first control signal 410a and/or the second control signal 410b) may include a beamforming configuration for the repeater device 406, e.g., such as a reception beam for receiving communication from the first wireless device 402 and/or the control node 404 and one or more transmission beams for forwarding communication to the second wireless device 408. The control signaling 410 may include a transmission power configuration. The control signaling 410 may include a configuration of an operating bandwidth. In some examples, the operating bandwidth may include frequency processing and filtering. The control signaling 410 may indicate a time domain resource allocation for the repeater device 406. The time domain resource allocation may include an UL/DL pattern that indicates when the repeater device 406 is configured to use UL and DL resources. For example, a time domain resource allocation may indicate time resources for the repeater device 406 to apply the indicated beamforming configuration. In some examples, the repeater device 406 may be configured with more than one beam to be applied at different times, e.g., a set of beams to apply in a pattern.

In some aspects, the repeater device 406 may be dynamically controlled by the control node 404 so that the configuration of the repeater device 406 can be dynamically adjusted or reconfigured depending on the conditions of the communication system including the first wireless device 402, the second wireless device 408, and the repeater device 406. However, in some scenarios, dynamic control of the repeater device 406 by the control node 404 may utilize additional power and/or signaling overhead. Aspects disclosed herein provide techniques that may enable reduction in the dynamic control signaling between the control node and the repeater to provide power savings for the MT of the repeater and the lower signal overhead for the control node.

For example, in FIG. 4, the first wireless device 402 may transmit a downlink signal 414 that may be received by the repeater device 406. The downlink signal 414 may carry downlink signals. At 418, the repeater device 406 may amplify the downlink signal 414 from the first wireless device 402. The repeater device 406 may then transmit a repeated signal 420 that is received by the second wireless device 408. The repeated signal 420 may be the downlink signal 414 that is amplified.

In another example, the second wireless device 408 may transmit an uplink signal 422 that is received by the repeater device 406. The uplink signal 422 may carry uplink signals. At 424, the repeater device 406 may amply the uplink signal 422. The repeater device 406 may then transmit a repeated signal 426 that is received by the first wireless device 402. The repeated signal 426 may be the uplink signal 422 that is amplified.

In some examples, the repeater device 406 may transition to a power saving mode or a low power mode. For example, after receiving the control signaling 410, the repeater device 406 may enter, at 412, a low power mode.

Figure 5:
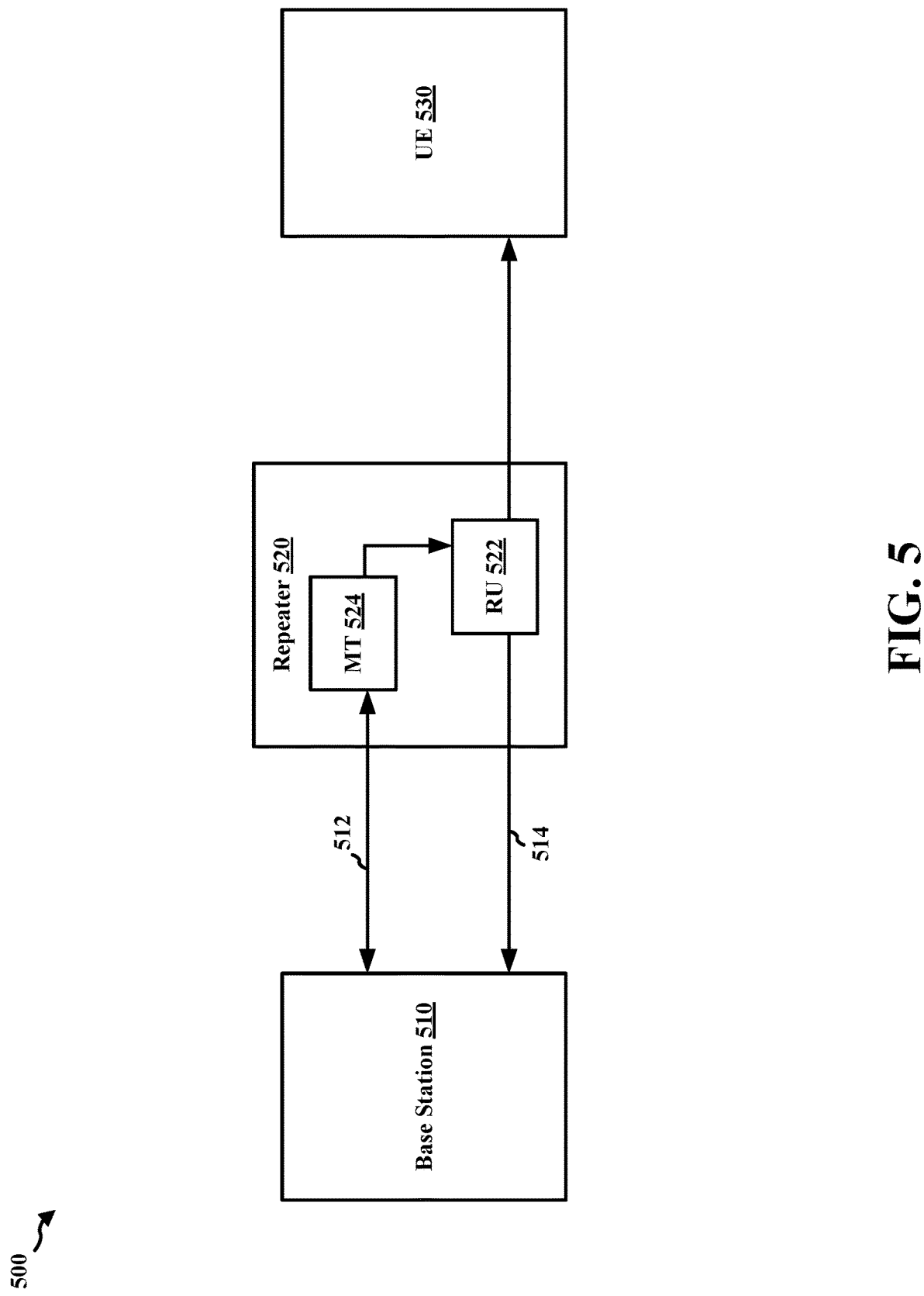
FIG. 5 is a block diagram of a communication system including a base station (e.g., gNB), a UE, and a repeater, which may include a repeating unit and a mobile termination, in accordance with various aspects of the present disclosure.

FIG. 5 is a block diagram of an example communication system 500 including a base station 510 (e.g., a gNB), a UE 530, and a repeater 520, which may include a repeating unit 522 ("RU") and a mobile termination 524 ("MT"). In some examples, the repeating unit 522 may be referred to as a remote unit. The base station 510 may correspond to the base station 102, 180 in FIG. 1, the base station 310 in FIG. 3, or a first wireless device 402 in FIG. 4. The UE 530 may correspond to the UE 104 in FIG. 1, the UE 350 in FIG. 3, or the second wireless device 408 in FIG. 4.

In FIG. 5, the repeating unit 522 of the repeater 520 may be configured to amplify and transmit downlink signals from the base station 510 to the UE 530 using an access link 514. The repeating unit 522 may also be configured to amplify and transmit uplink signals from the UE 530 to the base station 510 using the access link 514. Thus, the access link 514 may be used as a path that carries UL signals from the UE 530 and/or downlink signals to the UE 530. In some examples, the access link 514 may be controlled by the base station 510.

In some examples, the base station 510 may also establish a front-haul link 512 with the mobile termination 524 of the repeater 520. The front-haul link 512 may be configured to carry UL/DL control signals to configure the operation of the repeater 520. For example, the front-haul link 512 may use a control interface of the base station 510 to send messages to the repeater 520 to control the beamforming procedures or computations for downlink/uplink transmissions such as using different beams or beams directed to different directions to transmit to different UEs. Although FIG. 5 illustrates an example in which the control node is a base station, in other examples, the control node may be a different device, such as an IAB node. Additionally, the control node may provide control signaling to the repeater for use in repeating communication originating at a different device.

Figure 6:
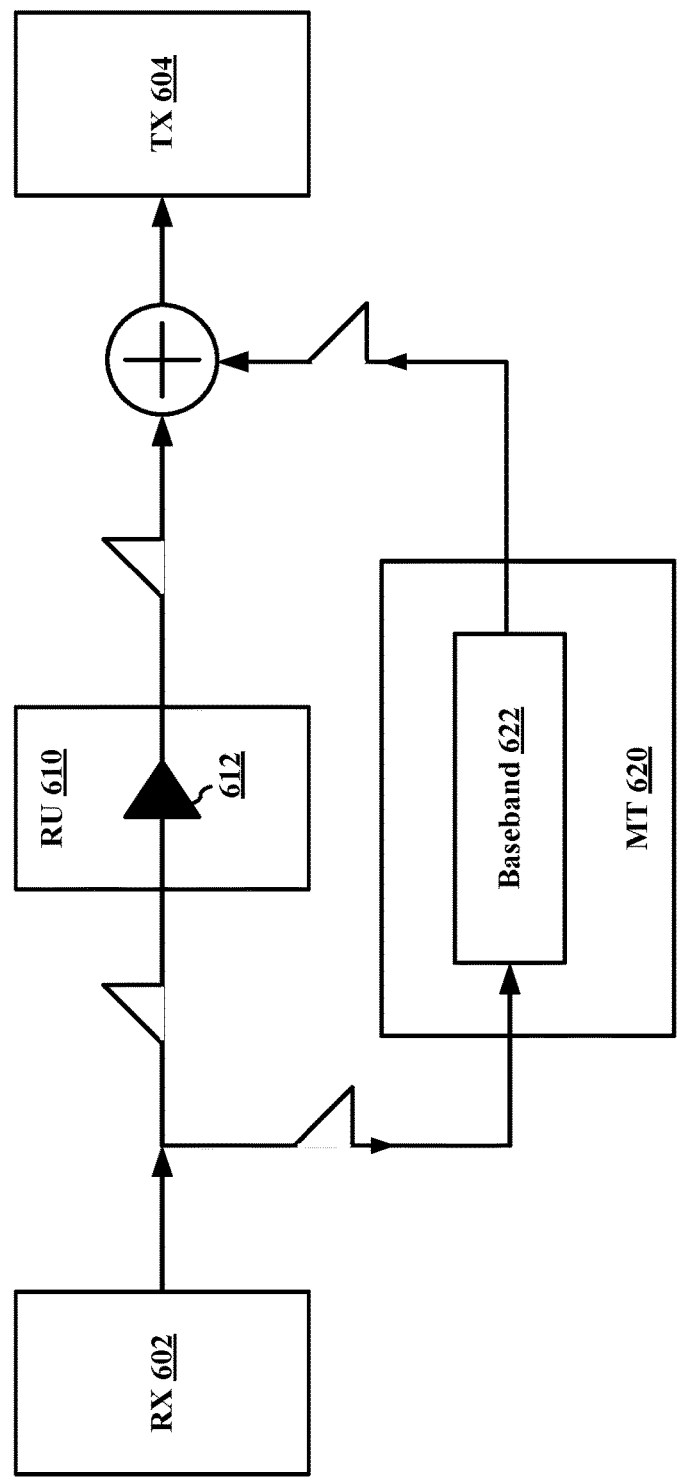
FIG. 6 is a schematic diagram of a repeater including a repeating unit (RU) and a mobile termination (MT) component, in accordance with various aspects of the present disclosure.

FIG. 6 is a schematic diagram of a repeater 600 including a repeating unit 610 ("RU") and a mobile termination component 620 ("MT"). The repeater 600 may also include a receive array 602 ("RX") and a transmit array 604 ("TX"). The receive array 602 may receive UL/DL signals (e.g., over a control link with a control node and access links with one or more devices for which the repeater forwards communication) and the transmit array 604 may transmit UL/DL signals (e.g., over the control link and access link(s)). The repeating unit 610 may include an analog amplifier 612 to amplify the UL/DL signals received at the receive array 602 and pass the amplified signals to the transmit array 604.

In FIG. 6, the mobile termination component 620 includes a baseband processor 622 configured to receive control signaling from a control node (e.g., the control node 404 of FIG. 4, the first wireless device 402, the base station 102, 180, 510, or the IAB node 103) through the receive array 602. The control signaling may include control parameters for the mobile termination component 620 in forwarding the communication. The repeating unit 610 applies the control configuration to the mobile termination component 620. For example, the repeating unit 610 may apply one or more control parameters to the transmit array 604 based on the control received by the mobile termination component 620 from the control node. The repeating unit 610 may receive and process a control signal from a control node similar to the UE 350 described in connection with FIG. 3.

Figure 7:
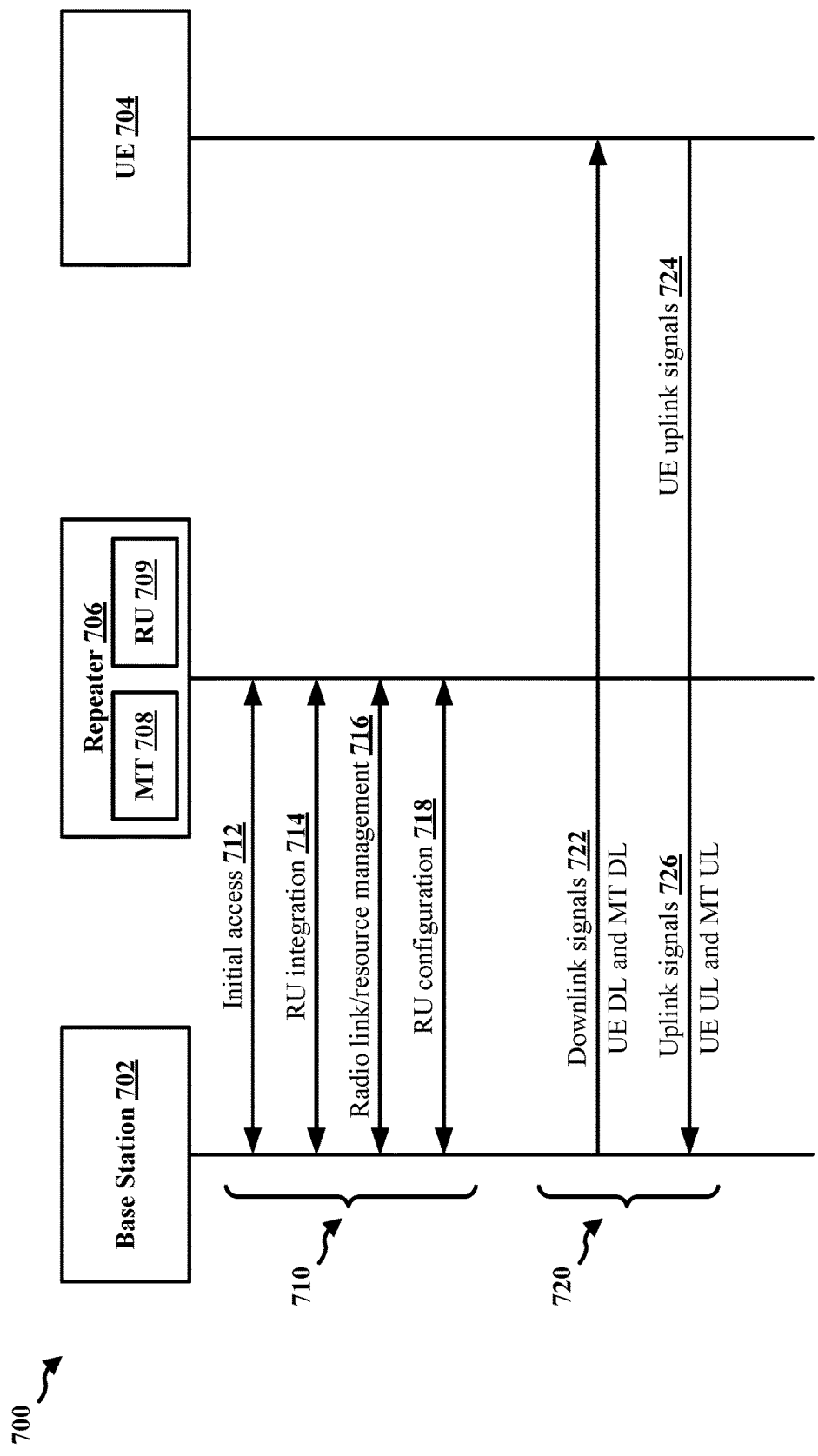
FIG. 7 illustrates an example communication flow between a base station and a UE through a repeater, in accordance with the teachings disclosed herein.

FIG. 7 illustrates an example communication flow 700 between a base station 702 and a UE 704 through a repeater 706, as presented herein. In the illustrated example, the repeater 706 includes a mobile termination component (e.g., an MT 708) and a repeating unit (e.g., an RU 709). The communication flow between the base station 702 and the repeater 706 may include front-haul procedures 710 including initial access 712, RU integration 714, radio link and resource management 716, and RU configuration 718. The front-haul procedures 710 may be performed by the base station 702 and the MT 708. The communication flow between the base station 702 and the UE 704 may be through the RU 709 of the repeater 706 and may include access-related procedures 720 including downlink signals 722 and uplink signals 726. The downlink signals 722 may include UE downlink signaling and/or MT downlink signaling from the base station 702 to the UE 704 and/or the MT 708, respectively. The uplink signals 726 may include UE uplink signals 724 from the UE 704 to the base station 702 and MT uplink signaling from the MT 708 to the base station 702.

In FIG. 7, the initial access 712 may include the repeater 706 announcing itself to the base station 702, establishing a control link, and establishing a radio link with the base station 702. The RU integration 714 may include configuring the integration of the repeater 706. The RU integration 714 may also include the MT 708 identifying itself as a repeater and sharing its capabilities to the base station 702. The radio link and resource management 716 may include radio link monitoring and beam management. The RU configuration 718 may include defining new control messages to configure the RU operation. The RU configuration 718 may include at least defining a beamforming configuration. The RU configuration 718 may also include establishing transmit power configuration and configurable operating bandwidth. The RU configuration 718 may further include time-domain resource allocation (e.g., on what resource to adopt the indicated beamforming configuration).

Figure 8:
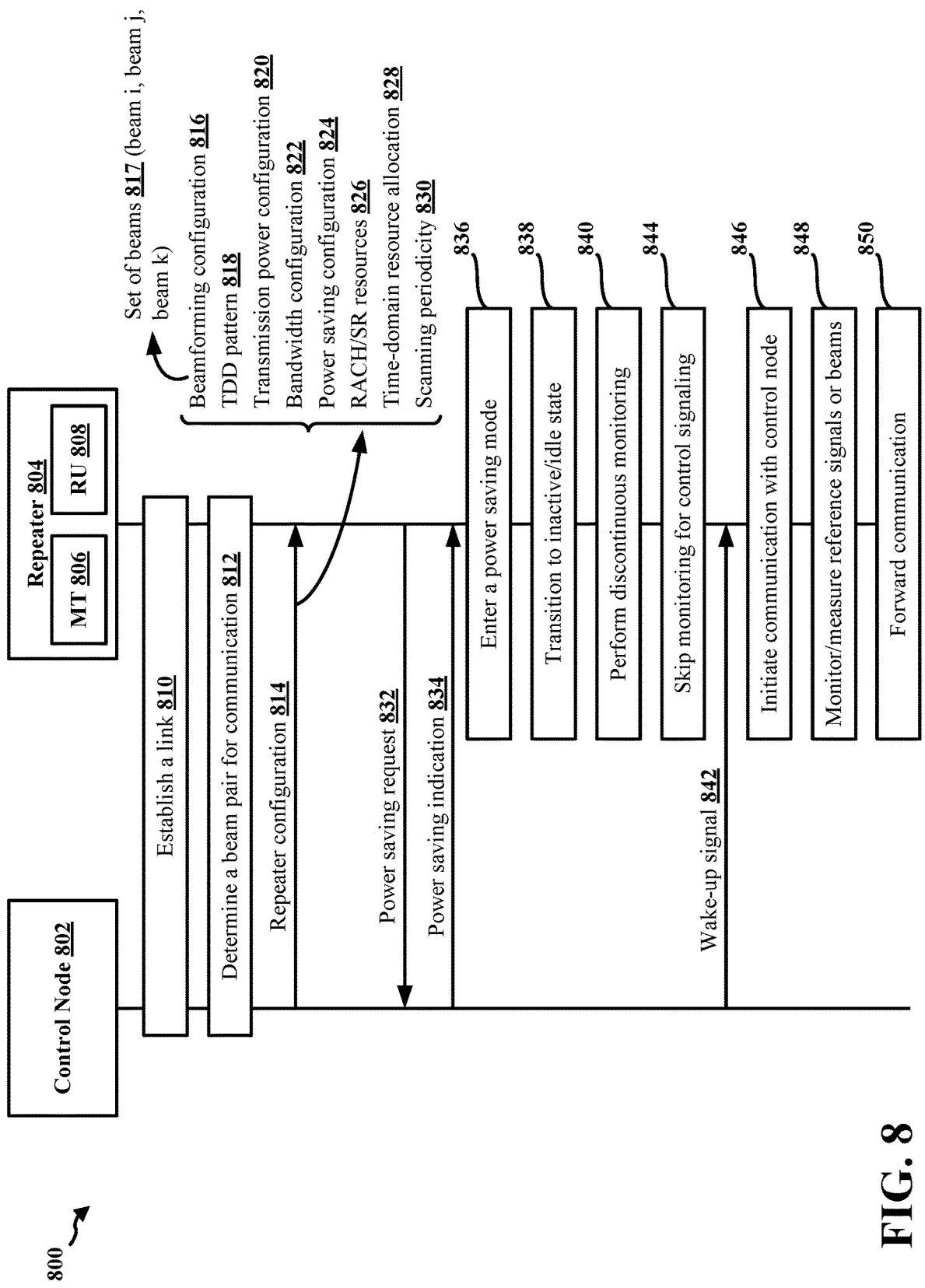
FIG. 8 illustrates an example communication flow between a control node and a repeater, in accordance with the teachings disclosed herein.

As described in connection with FIG. 4, the repeater device may receive control signaling from a control node. For example, FIG. 8 illustrates an example communication flow 800 between a control node 802 and a repeater 804, as presented herein. In the illustrated example, the communication flow 800 facilitates improving power saving at a repeater and/or lower signaling overhead of the control node based on signaling from the control node. Aspects of the control node 802 may be implemented by the control node 404 of FIG. 4, the base station 510 of FIG. 5, and/or the base station 702 of FIG. 7. Aspects of the repeater 804 may be implemented by the repeater device 406 of FIG. 4, the repeater 520 of FIG. 5, the repeater 600 of FIG. 6, and/or the repeater 706 of FIG. 7. Although not shown in the illustrated example of FIG. 8, it may be appreciated that in additional or alternative examples, the control node 802 may be in communication with one or more other repeaters, and/or the repeater 804 may be in communication with one or more other control nodes.

As shown in FIG. 8, the repeater 804 includes a mobile termination (e.g., an MT 806) and a repeating unit (e.g., an RU 808). Aspects of the MT 806 may be implemented by the mobile termination 524 of FIG. 5 and/or the MT 708 of FIG. 7. Aspects of the RU 808 may be implemented by the repeating unit 522 of FIG. 5, and/or the RU 709 of FIG. 7.

In the illustrated example of FIG. 8, the control node 802 and the repeater 804, at 810, establish a link, such as a control link. The link may facilitate a control interface between the control node 802 and the repeater 804 for communicating control signaling. At 812, the control node 802 and the repeater 804 may determine a beam pair for communication. For example, when communication between the control node 802 and the repeater 804 occurs using higher frequencies (e.g., FR2, etc.), then it may be beneficial for the control node 802 and the repeater 804 to establish a beam pair to facilitate communication between the control node 802 and the repeater 804. Aspects of 810 and 812 may be implemented by the front-haul procedures 710 of FIG. 7.

After establishing a link with the repeater 804, the control node 802 transmits a repeater configuration 814 that is received by the repeater 804. The repeater configuration 814 may include one or more parameters that the repeater applies for communication between a first wireless device, such as the base station 702 of FIG. 7, and a second wireless device, such as the UE 704 of FIG. 7. The repeater configuration 814 may provide one or more parameters for upcoming slots. In some examples, the repeater configuration 814 may include periodic configurations. In some examples, the repeater configuration 814 may include semi-static configurations. For example, the one or more parameters may be applicable for a period of time. In some examples, the one or more parameters may be applicable to a link between the first wireless device and the repeater (e.g., the RU 808). In some examples, the one or more parameters may be applicable to a link between the second wireless device and the repeater (e.g., the RU 808). In some examples, the one or more parameters may be applicable to the link between the first wireless device and the RU 808 and to the link between the second wireless device and the RU 808.

As shown in FIG. 8, the repeater configuration 814 may include one or more parameters. For example, the repeater configuration 814 may include a beamforming configuration 816 that may configure TX/RX beams at the repeater 804. The repeater configuration 814 may include a TDD pattern 818 that may define slots configured for UL and/or DL. The repeater configuration 814 may include a transmission power configuration 820 that may configure the repeater 804 to apply a transmit power when repeating a signal. The repeater configuration 814 may include a bandwidth configuration 822 that defines an operating bandwidth for the repeater 804. The repeater configuration 814 may include a power saving configuration 824 that may indicate a power saving scheme for the repeater 804. The repeater configuration 814 may include random access channel (RACH) and/or scheduling request (RS) resources (e.g., RACH/SR resources 826) that indicate resources that the repeater 804 may use to initiate a communication with the control node 802. The repeater configuration 814 may include time-domain resource allocation 828 that defines time-domain resources for the repeater 804. The repeater configuration 814 may include a scanning periodicity 830 that configures the repeater 804 to scan for and/or measure reference signals and/or beams with a reduced periodicity.

In some examples, communication between the control node 802 and the MT 806 may be infrequent. For example, the repeater configuration 814 may provide semi-static configurations that the repeater 804 may use for repeating operations for an extended period of time (e.g., while the semi-static configurations are valid). For example, the repeater 804 may be configured to avoid switching beams frequently and/or communications using beam pairs may be stable such that the repeater 804 may avoid switching beams frequently. In such examples, the repeater configuration 814 may include the beamforming configuration 816. The beamforming configuration 816 may configure TX/RX beams of the repeater 804. The control node 802 may also provide the TDD pattern 818 for applying to a set of beams 817. The repeater 804 may apply the TX/RX beams based on the TDD pattern 818. For example, the control node 802 may indicate the set of beams 817 including a beam i, a beam j, and a beam k. Based on the beamforming configuration 816, the set of beams 817, and the TDD pattern 818, the repeater 804 may use beam i in a first slot, may use beam j in a second slot, and may use beam k in a third slot. The repeater 804 may repeat the beam pattern based on a periodic pattern. The repeater 804 may use the beamforming configuration 816, the set of beams 817, and the TDD pattern 818 to facilitate communication between the first wireless device and the second wireless device.

As another example, the control node 802 may configure the repeater 804 with the set of beams 817 (or a beam pattern) to apply for an extended time interval. Configuring the repeater 804 to use the set of beams 817 (or the beam pattern) for the extended time interval may be beneficial in scenarios in which the repeater 804 may be unable to monitor for control signaling, e.g., over the extended time interval. In such examples, the control node 802 may avoid reconfiguring the repeater 804 during the extended time intervals.

In some examples, the link (e.g., the control link) between the control node 802 and the repeater 804 may be stable. For example, the control node 802 and the repeater 804 may be stationary. In such examples, the control node 802 may avoid performing frequent reconfiguring of the repeater 804.

In some examples, the control node 802 may cause the repeater 804 to transition to a power saving mode or a low power mode. For example, the control node 802 may transmit a power saving indication 834 that is received by the repeater 804. At 836, the repeater 804 may enter a power saving mode. In some examples, the repeater 804 may enter the power saving mode after receiving control signaling, as described in connection with 412 of FIG. 4. In other examples, the repeater 804 may transition to the power saving mode at a different time. In some examples, the repeater 804 may transmit a power saving request 832 that is received by the control node 802. In such examples, the control node 802 may transmit the power saving indication 834 after receiving the power saving request 832.

In some examples, while operating in the power saving mode, the RU 808 of the repeater 804 may continue forwarding communications, at 850, between the first wireless device and the second wireless device, as described in connection with the access-related procedures 720 of FIG. 7. In some examples, the repeater 804 and the RU 808 may apply one or more of the parameters of the repeater configuration 814 when forwarding the communications. For example, the repeater 804 may use the beamforming configuration 816, the transmission power configuration 820, the bandwidth configuration 822, and/or the time-domain resource allocation 828 to forward communication between the first wireless device and the second wireless device.

In some examples, while operating in the low power mode, the repeater 804 may transition the MT 806 to a low power mode. For example, at 838, the MT 806 may transition to an RRC inactive mode or to an RRC idle mode. While the MT 806 is operating in the low power mode (e.g., the RRC inactive mode or the RRC idle mode), the MT 806 may perform one or more operations based on the one or more parameters of the repeater configuration 814. For example, the MT 806 may be configured to perform reduced operating during the power saving mode based on the power saving configuration 824 of the repeater configuration 814. In some examples, the MT 806 may perform, at 840, discontinuous monitoring for control signaling (e.g., the first control signal 410a and/or the second control signal 410b of FIG. 4) or for a wake-up signal 842 from the control node 802. The MT 806 may skip, at 844, monitoring for a control signal until a configured time. The configured time may be based on a duration of a power saving phase based on the power saving configuration 824.

In some examples, the MT 806 may, at 846, initiate communication with the control node 802. For example, the repeater configuration 814 may include the RACH/SR resources 826 that indicate resources that the repeater 804 may use to initiate a communication with the control node 802. In such examples, the MT 806 may use the dedicated RACH resources and/or the SR resources of the RACH/SR resources 826 to initiate the communication with the control node 802.

In some examples, the MT 806 may, at 848, monitor/measure reference signals or beams (e.g., for radio resource management (RRM) or radio link management (RLM)) with a reduced periodicity. For example, the repeater configuration 814 may include the scanning periodicity 830 that configures the repeater 804 to scan for and/or measure reference signals and/or beams with a reduced periodicity. In such examples, the MT 806 may use the scanning periodicity 830 to monitor/measure reference signals and/or beams.

Figure 9:
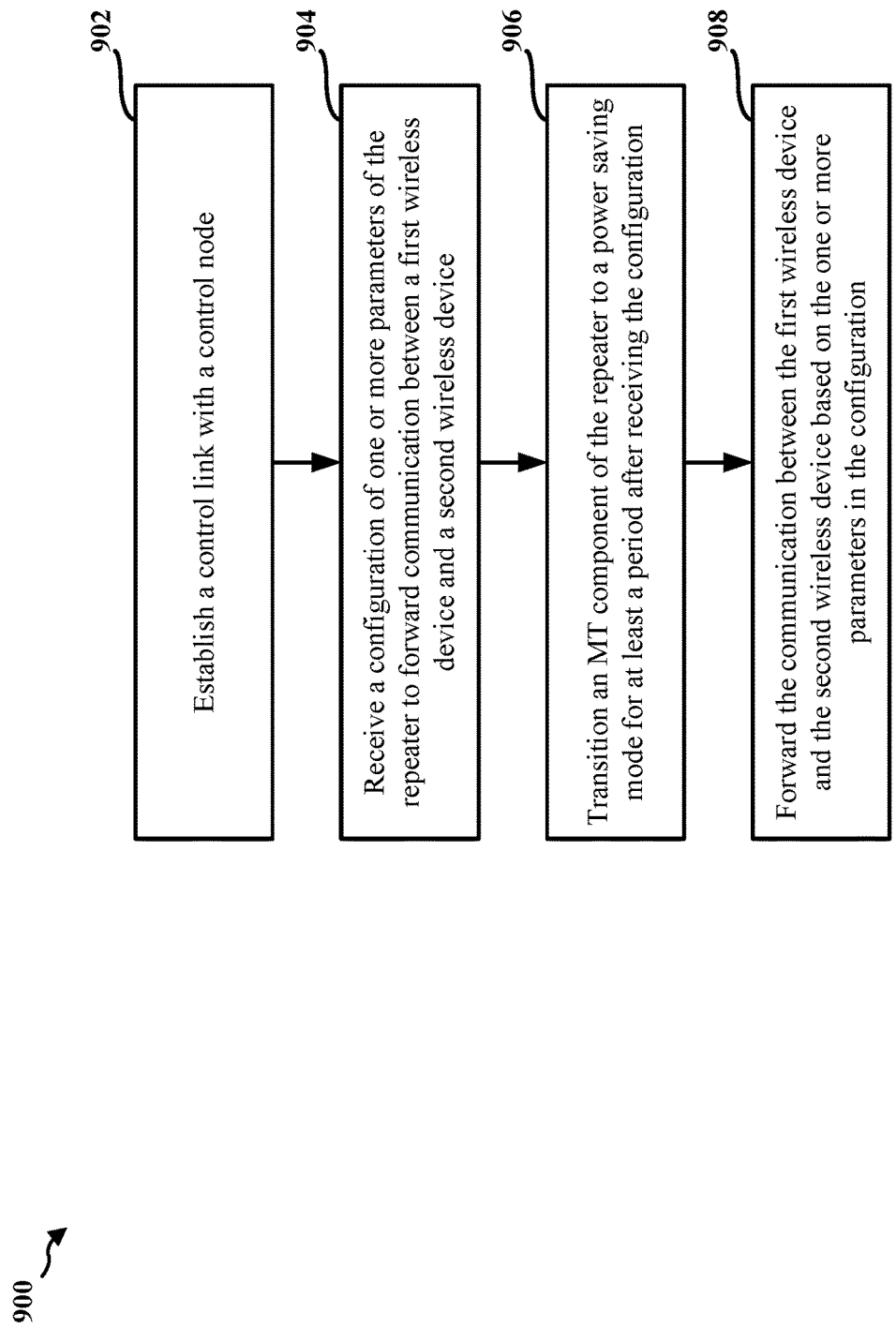
FIG. 9 is a flowchart of a method of wireless communication at a repeater, in accordance with the teachings disclosed herein.

FIG. 9 is a flowchart 900 of a method of wireless communication. The method may be performed by a repeater (e.g., the repeater 107 of FIG. 1, the repeater device 406 of FIG. 4, the repeater 706 of FIG. 7, the repeater 804 of FIG. 8, and/or an apparatus 1102 of FIG. 11). The method may facilitate improving power saving at a repeater and/or lower signaling overhead of the control node based on signaling from the control node.

In one aspect, the repeater includes an analog repeater that is configured to receive, amplify, and forward a signal between a first wireless device and a second wireless device.

At 902, the repeater establishes a control link with a control node, as described in connection with 810 of FIG. 8. In some examples, the repeater may establish the control link during the initial access 712 of the front-haul procedures 710 of FIG. 7. In some examples, the repeater may receive control signaling from the control node over the control link using a same frequency as the communication forwarded by the repeater. In some examples, the repeater may receive control signaling from the control node over the control link using a different frequency as the communication forwarded by the repeater. In another aspect, the control node may be one of multiple nodes communicating with the repeater. The establishing of the control link with the control node, at 902, may be performed by an establishment component 1140 of the apparatus 1102 of FIG. 11.

At 904, the repeater receives, via the control link, a configuration of one or more parameters of the repeater to forward communication between a first wireless device and a second wireless device, as described in connection with the RU configuration 718 of FIG. 7 and/or the repeater configuration 814 of FIG. 8. The receiving of the configuration of the one or more parameters, at 904, may be performed by a configuration component 1142 of the apparatus 1102 of FIG. 11.

In some examples, the one or more parameters may include a beamforming configuration, such as the beamforming configuration 816 of FIG. 8. In some examples, the one or more parameters may include a TDD pattern, such as the TDD pattern 818 of FIG. 8. In some examples, the one or more parameters may include a transmission power configuration, such as the transmission power configuration 820 of FIG. 8. In some examples, the one or more parameters may include a bandwidth configuration, such as the bandwidth configuration 822 of FIG. 8. In some examples, the one or more parameters may include a power saving configuration, such as the power saving configuration 824 of FIG. 8.

In some examples, the configuration may include a periodic configuration of the one or more parameters for at least one of a first link between the repeater and the first wireless device or a second link between the repeater and the second wireless device. In some examples, the configuration may include a semi-static configuration of the one or more parameters, and wherein the repeater applies the semi-static configuration for a period of time.

In one aspect, the first wireless device is a base station, a user equipment, an additional repeater, or an IAB node. In another aspect, the second wireless device is a base station, a user equipment, an additional repeater, or an IAB node.

At 906, the repeater transitions an MT component of the repeater to a power saving mode for at least a period of time after receiving the configuration, as described in connection with 836 of FIG. 8. The transitioning to the power saving mode, at 906, may be performed by a transition component 1144 of the apparatus 1102 of FIG. 11.

In some examples, the power saving mode may include reducing, at 1012, monitoring for a control, as described in connection with 840 of FIG. 8. In some examples, the power saving mode may include monitoring, at 1014, for a wake-up signal, as described in connection with the wake-up signal 842. In some examples, the power saving mode may include skipping, at 1016, monitoring for the control signal for a duration of time, as described in connection with 844 of FIG. 8. In some examples, the power saving mode may include using a configured random access resource (e.g., at 1018) or a configured scheduling request resource (e.g., at 1020) to initiate control communication with the control node over the control link as described in connection with 846 of FIG. 8. In some examples, the power saving mode may include reducing reference signal measurements (e.g., at 1022) and/or reducing beam measurements (e.g., at 1024), as described in connection with 848 of FIG. 8. In some examples, the power saving mode may include setting the MT component to an RRC inactive mode (e.g., at 1026) or to an RRC idle mode (e.g., at 1028), as described in connection with 838 of FIG. 8. Aspects of the power saving mode, at 1012, 1014, 1016, 1018, 1020, 1022, 1024, 1026, and/or 1028, may be performed by a power saving component 1148 of the apparatus 1102 of FIG. 11.

At 908, the repeater forwards the communication between the first wireless device and the second wireless device based on the one or more parameters in the configuration, as described in connection with the access-related procedures 720 of FIG. 7. For example, the repeater may forward downlink signals 722 from the base station 702 to the UE 704, or the repeater may forward UE uplink signals 724 from the UE 704 to the base station 702. The forwarding of the communication between the first wireless device and the second wireless device, at 908, may be performed by a forwarding component 1146 of the apparatus 1102 of FIG. 11.

In some examples, the repeater forwards the communication between while operating in the power saving mode. For example, the repeater may include an RU that forwards the communication between the first wireless device and the second wireless device while the MT component is in the power saving mode, as described in connection with 850 of FIG. 8. The repeater may forward the communication based on the beamforming configuration 816, the transmission power configuration 820, the bandwidth configuration 822, and/or the time-domain resource allocation 828 received from the control node via the configuration (e.g., at 1104).

Figure 10:
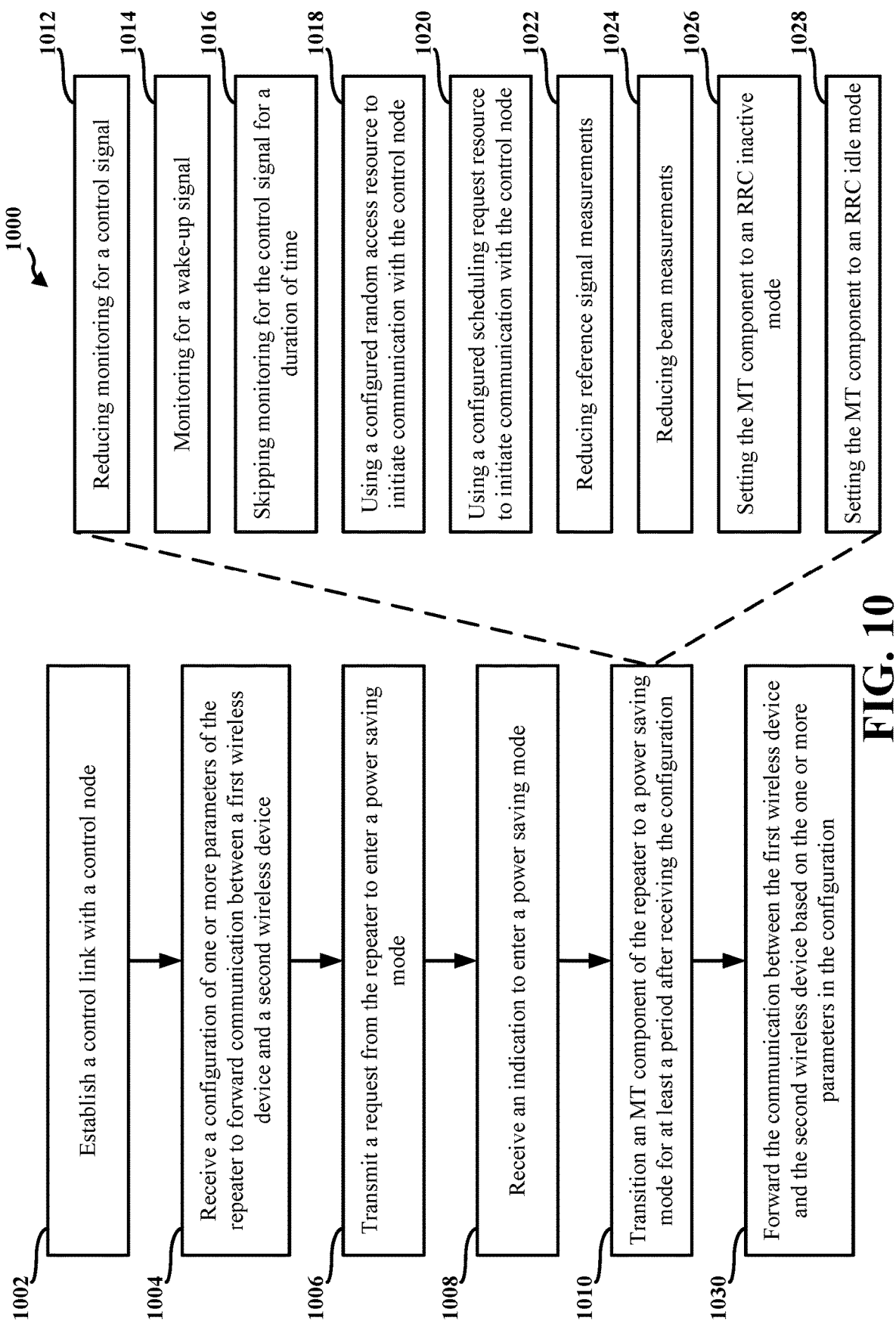
FIG. 10 is a flowchart of a method of wireless communication at a repeater, in accordance with the teachings disclosed herein.

FIG. 10 is a flowchart 1000 of a method of wireless communication. The method may be performed by a repeater (e.g., the repeater 107 of FIG. 1, the repeater device 406 of FIG. 4, the repeater 706 of FIG. 7, the repeater 804 of FIG. 8, and/or an apparatus 1102 of FIG. 11). The method may facilitate improving power saving at a repeater and/or lower signaling overhead of the control node based on signaling from the control node.

In one aspect, the repeater includes an analog repeater that is configured to receive, amplify, and forward a signal between a first wireless device and a second wireless device.

At 1002, the repeater establishes a control link with a control node, as described in connection with 810 of FIG. 8. In some examples, the repeater may establish the control link during the initial access 712 of the front-haul procedures 710 of FIG. 7. In some examples, the repeater may receive control signaling from the control node over the control link using a same frequency as the communication forwarded by the repeater. In some examples, the repeater may receive control signaling from the control node over the control link using a different frequency as the communication forwarded by the repeater. In another aspect, the control node may be one of multiple nodes communicating with the repeater. The establishing of the control link with the control node, at 1002, may be performed by an establishment component 1140 of the apparatus 1102 of FIG. 11.

At 1004, the repeater receives, via the control link, a configuration of one or more parameters of the repeater to forward communication between a first wireless device and a second wireless device, as described in connection with the RU configuration 718 of FIG. 7 and/or the repeater configuration 814 of FIG. 8. The receiving of the configuration of the one or more parameters, at 1004, may be performed by a configuration component 1142 of the apparatus 1102 of FIG. 11.

In some examples, the one or more parameters may include a beamforming configuration, such as the beamforming configuration 816 of FIG. 8. In some examples, the one or more parameters may include a TDD pattern, such as the TDD pattern 818 of FIG. 8. In some examples, the one or more parameters may include a transmission power configuration, such as the transmission power configuration 820 of FIG. 8. In some examples, the one or more parameters may include a bandwidth configuration, such as the bandwidth configuration 822 of FIG. 8. In some examples, the one or more parameters may include a power saving configuration, such as the power saving configuration 824 of FIG. 8.

In some examples, the configuration may include a periodic configuration of the one or more parameters for at least one of a first link between the repeater and the first wireless device or a second link between the repeater and the second wireless device. In some examples, the configuration may include a semi-static configuration of the one or more parameters, and wherein the repeater applies the semi-static configuration for a period of time.

In one aspect, the first wireless device is a base station, a user equipment, an additional repeater, or an IAB node. In another aspect, the second wireless device is a base station, a user equipment, an additional repeater, or an IAB node.

At 1010, the repeater transitions an MT component of the repeater to a power saving mode for at least a period of time after receiving the configuration, as described in connection with 836 of FIG. 8. The transitioning to the power saving mode, at 1010, may be performed by a transition component 1144 of the apparatus 1102 of FIG. 11.

In some examples, the power saving mode may include reducing, at 1012, monitoring for a control, as described in connection with 840 of FIG. 8. In some examples, the power saving mode may include monitoring, at 1014, for a wake-up signal, as described in connection with the wake-up signal 842. In some examples, the power saving mode may include skipping, at 1016, monitoring for the control signal for a duration of time, as described in connection with 844 of FIG. 8. In some examples, the power saving mode may include using a configured random access resource (e.g., at 1018) or a configured scheduling request resource (e.g., at 1020) to initiate control communication with the control node over the control link as described in connection with 846 of FIG. 8. In some examples, the power saving mode may include reducing reference signal measurements (e.g., at 1022) and/or reducing beam measurements (e.g., at 1024), as described in connection with 848 of FIG. 8. In some examples, the power saving mode may include setting the MT component to an RRC inactive mode (e.g., at 1026) or to an RRC idle mode (e.g., at 1028), as described in connection with 838 of FIG. 8. Aspects of the power saving mode, at 1012, 1014, 1016, 1018, 1020, 1022, 1024, 1026, and/or 1028, may be performed by a power saving component 1148 of the apparatus 1102 of FIG. 11.

At 1030, the repeater forwards the communication between the first wireless device and the second wireless device based on the one or more parameters in the configuration, as described in connection with the access-related procedures 720 of FIG. 7. For example, the repeater may forward downlink signals 722 from the base station 702 to the UE 704, or the repeater may forward UE uplink signals 724 from the UE 704 to the base station 702. The forwarding of the communication between the first wireless device and the second wireless device, at 1030, may be performed by a forwarding component 1146 of the apparatus 1102 of FIG. 11.

In some examples, the repeater forwards the communication between while operating in the power saving mode. For example, the repeater may include an RU that forwards the communication between the first wireless device and the second wireless device while the MT component is in the power saving mode, as described in connection with 850 of FIG. 8. The repeater may forward the communication based on the beamforming configuration 816, the transmission power configuration 820, the bandwidth configuration 822, and/or the time-domain resource configuration 828 received from the control node via the configuration (e.g., at 1104).

In some examples, the repeater, at 1008, may receive, from the control node, an indication for the MT component to enter the power saving mode, as described in connection with the power saving indication 834 of FIG. 8. The receiving of the indication, at 1008, may be performed by an indication component 1152 of the apparatus 1102 of FIG. 11.

In some examples, the repeater, at 1006, may transmit a request to the control node to enter the power saving mode prior to receiving the indication from the control node, as described in connection with the power saving request 832 of FIG. 8. The transmitting of the request, at 1006, may be performed by a request component 1150 of the apparatus 1102 of FIG. 11.

Figure 11:
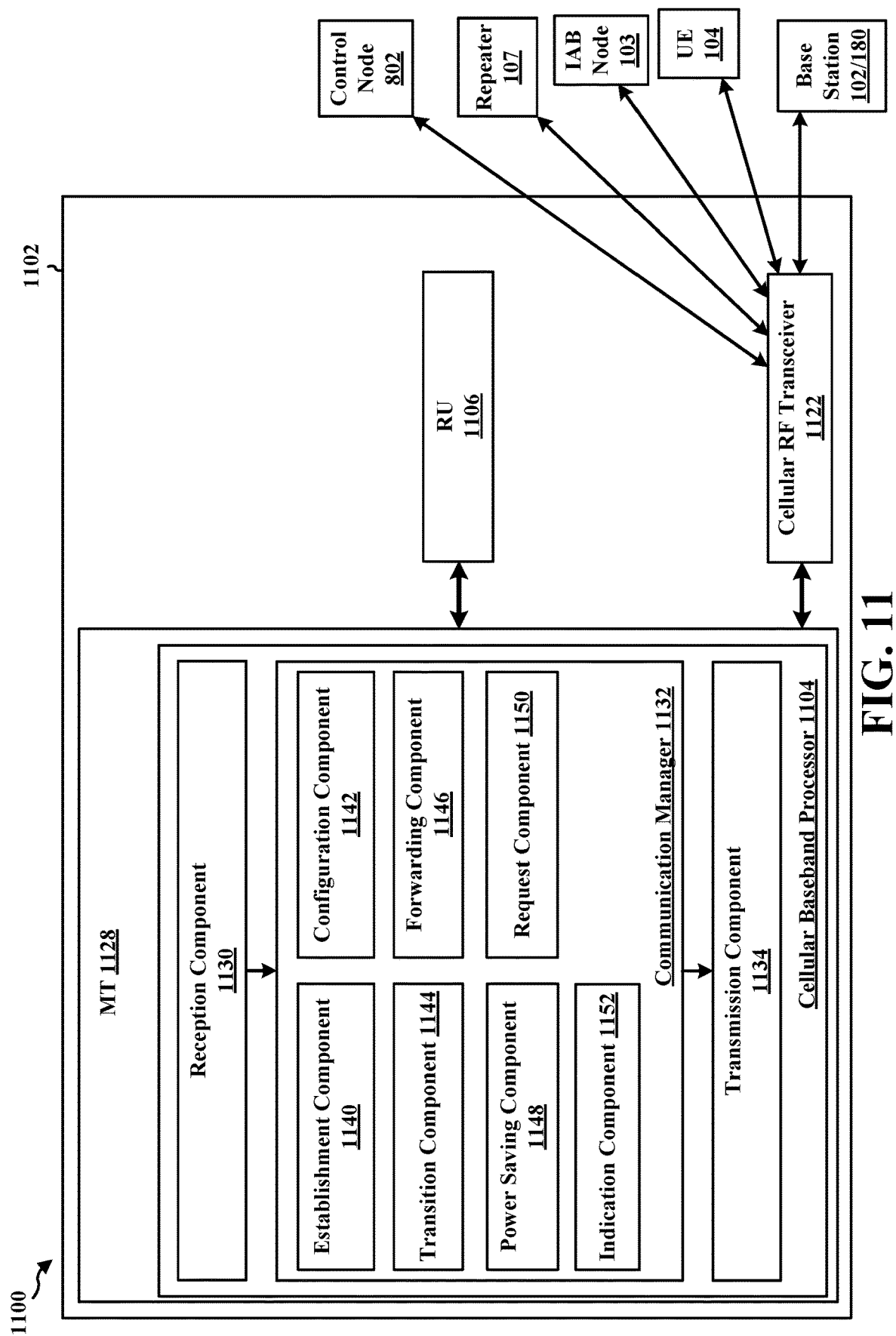
FIG. 11 is a diagram illustrating an example of a hardware implementation for an example apparatus, in accordance with the teachings disclosed herein.

FIG. 11 is a diagram 1100 illustrating an example of a hardware implementation for an apparatus 1102. The apparatus 1102 may be a repeater (e.g., the repeater 107 of FIG. 1), a component of a repeater, or may implement repeater functionality. The apparatus 1102 includes an MT component 1128 with a cellular baseband processor 1104 (also referred to as a modem) coupled to a cellular RF transceiver 1122. The apparatus 1102 also includes an RU portion 1106 that receives, amplifies, and forwards wireless communication between a first wireless device and a second wireless device.

The first wireless device may be the base station 102,180, the IAB node 103, the UE 104, or another repeater 107. The second wireless device may be the base station 102,180, the IAB node 103, the UE 104, or another repeater 107. The MT component 1128 receives and processes control signaling from the control node 802 and applies the control to the RU portion 1106. The cellular baseband processor 1104 communicates through the cellular RF transceiver 1122 with the control node 802 (e.g., a base station 102/180) to receive control signaling for the cellular baseband processor 1104 and/or MT component 1128.

The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the repeater 107 and may include the memory and/or at least one of a TX processor, a RX processor, and a controller/processor.

The communication manager 1132 includes an establishment component 1140 that is configured to establish a control link with a control node, for example, as described in connection with 902 of FIG. 9 and/or 1002 of FIG. 10.

The communication manager 1132 also includes a configuration component 1142 that is configured to receive, via the control link, a configuration of one or more parameters of the repeater to forward communication between a first wireless device and a second wireless device, for example, as described in connection with 904 of FIG. 9 and/or 1004 of FIG. 10.

The communication manager 1132 also includes a transition component 1144 that is configured to transition an MT component of the repeater to a power saving mode for at least a period of time after receiving the configuration, for example, as described in connection with 906 of FIG. 9 and/or 1006 of FIG. 10.

The communication manager 1132 also includes a forwarding component 1146 that is configured to forward the communication between the first wireless device and the second wireless device based on the one or more parameters in the configuration, for example, as described in connection with 908 of FIG. 9 and/or 1030 of FIG. 10.

The communication manager 1132 also includes a power saving component 1148 that is configured to one or more of reduce monitoring for a control signal, monitor for a wake-up signal, skip monitoring for the control signal for a duration of time, use a configured random access resource to initiate control communication with the control node over the control link, use a configured scheduling request resource to initiate control communication with the control node over the control link, reduce reference signal measurement, reduce beam measurement, set the MT component to an RRC inactive mode, or set the MT component to an RRC idle mode, for example, as described in connection with 1012, 1014, 1016, 1018, 1020, 1022, 1024, 1026, 1028, respectively, of FIG. 10.

The communication manager 1132 also includes a request component 1150 that is configured to transmit a request to the control node to enter the power saving mode prior to receiving the indication from the control node, for example, as described in connection with 1006 of FIG. 10.

The communication manager 1132 also includes indication component 1152 that is configured to receive, from the control node, an indication for the MT component to enter the power saving mode, wherein the repeater transitions the MT component to the power saving mode based on the indication from the control node, for example, as described in connection with 1008 of FIG. 10.

The apparatus may include additional components that perform each of the blocks of the algorithm in the flowcharts of FIG. 9 and/or 10. As such, each block in the flowcharts of FIGS. 9 and/or 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the cellular baseband processor 1104, includes means for establishing a control link with a control node. The example apparatus 1102 also includes means for receiving, via the control link, a configuration of one or more parameters of the repeater to forward communication between a first wireless device and a second wireless device. The example apparatus 1102 also includes means for transitioning an MT component of the repeater to a power saving mode for at least a period of time after receiving the configuration. The example apparatus 1102 also includes means for forwarding the communication between the first wireless device and the second wireless device based on the one or more parameters in the configuration.

In another configuration, the example apparatus 1102 also includes means for receiving, from the control node, an indication for the MT component to enter the power saving mode, wherein the repeater transitions the MT component to the power saving mode based on the indication from the control node.

In another configuration, the example apparatus 1102 also includes means for one or more of: reducing monitoring for a control signal, monitoring for a wake-up signal, skipping monitoring for the control signal for a duration of time, using a configured random access resource to initiate control communication with the control node over the control link, using a configured scheduling request resource to initiate control communication with the control node over the control link, reducing reference signal measurement, reducing beam measurement, setting the MT component to RRC inactive mode, or setting the MT component to an RRC idle mode.

In another configuration, the example apparatus 1102 also includes means for transmitting a request to the control node to enter the power saving mode prior to receiving the indication from the control node.

The means may be one or more of the components of the apparatus 1102 configured to perform the functions recited by the means. As described supra, the apparatus 1102 may include the TX processor 368, the RX processor 356, and the controller/processor 359. As such, in one configuration, the means may be the TX processor 368, the RX processor 356, and the controller/processor 359 configured to perform the functions recited by the means.

Figure 12:
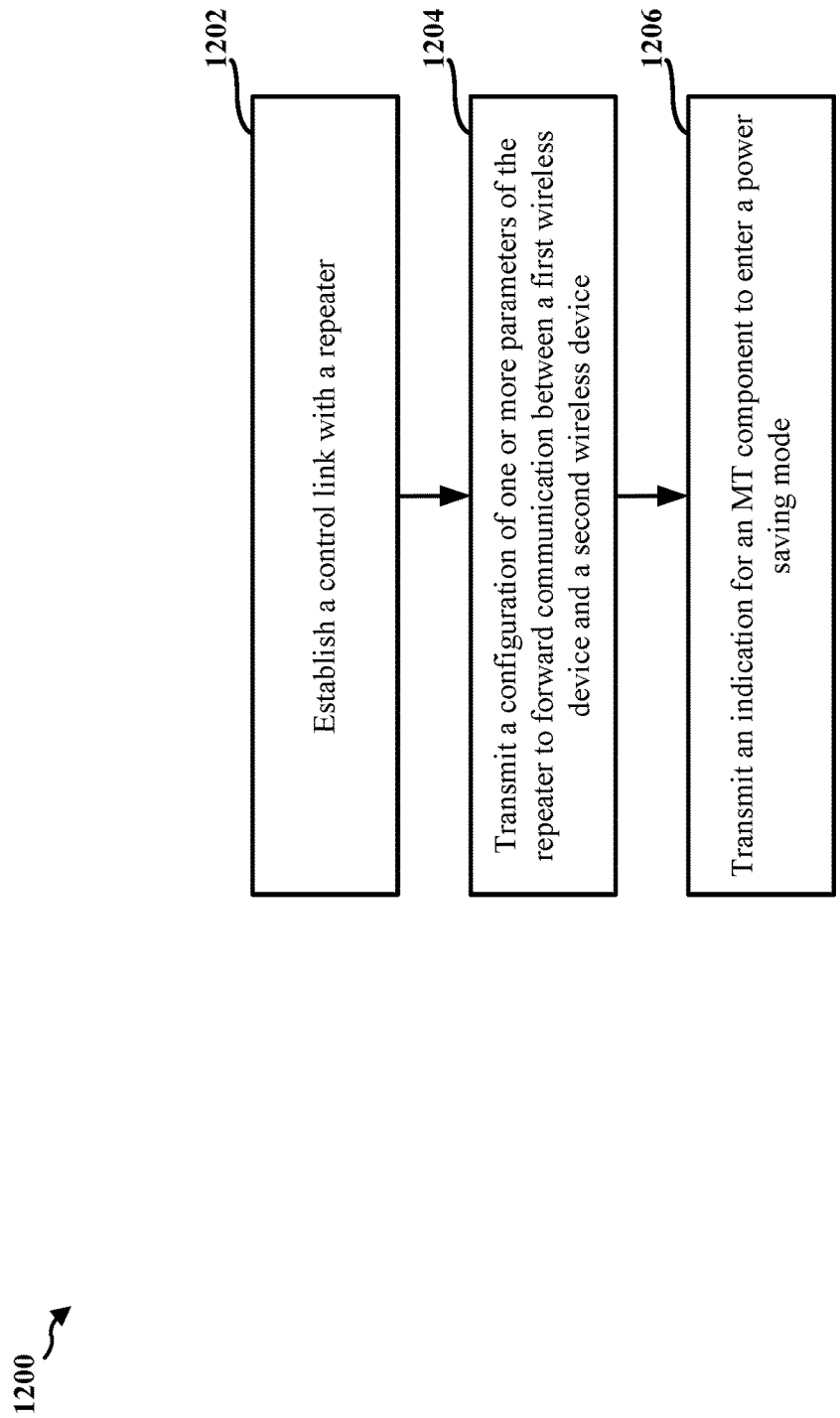
FIG. 12 is a flowchart of a method of wireless communication at a control node, in accordance with the teachings disclosed herein.

FIG. 12 is a flowchart 1200 of a method of wireless communication. The method may be performed by a control node (e.g., a base station 102, 180 of FIG. 1, an IAB node 103 of FIG. 1, the control node 404 of FIG. 4, the control node 802 of FIG. 8, and/or an apparatus 1402 of FIG. 14). The method may facilitate improving power saving at a repeater and/or lower signaling overhead of the control node based on signaling from the control node.

In one aspect, the repeater includes an analog repeater that is configured to receive, amplify, and forward a signal between a first wireless device and a second wireless device.

At 1202, the control node establishes a control link with a repeater, as described in connection with 810 of FIG. 8. In some examples, the control node may establish the control link during the initial access 712 of the front-haul procedures 710 of FIG. 7. In some examples, the control node may transmit control signaling to the repeater over the control link using a same frequency as the communication forwarded by the repeater. In some examples, the control node may transmit control signaling to the repeater over the control link using a different frequency as the communication forwarded by the repeater. In another aspect, the control node may be one of multiple nodes communicating with the repeater. The establishing of the control link with the repeater, at 1202, may be performed by an establishment component 1440 of the apparatus 1402 of FIG. 14.

At 1204, the control node transmits, via the control link, a configuration of one or more parameters of the repeater to forward communication between a first wireless device and a second wireless device, as described in connection with the RU configuration 718 of FIG. 7 and/or the repeater configuration 814 of FIG. 8. The transmitting of the configuration of the one or more parameters, at 1204, may be performed by a configuration component 1442 of the apparatus 1402 of FIG. 14.

In some examples, the one or more parameters may include a beamforming configuration, such as the beamforming configuration 816 of FIG. 8. In some examples, the one or more parameters may include a TDD pattern, such as the TDD pattern 818 of FIG. 8. In some examples, the one or more parameters may include a transmission power configuration, such as the transmission power configuration 820 of FIG. 8. In some examples, the one or more parameters may include a bandwidth configuration, such as the bandwidth configuration 822 of FIG. 8. In some examples, the one or more parameters may include a power saving configuration, such as the power saving configuration 824 of FIG. 8.

In some examples, the configuration may include a periodic configuration of the one or more parameters for at least one of a first link between the repeater and the first wireless device or a second link between the repeater and the second wireless device. In some examples, the configuration may include a semi-static configuration of the one or more parameters, and wherein the repeater applies the semi-static configuration for a period of time.

In one aspect, the first wireless device is a base station, a user equipment, an additional repeater, or an IAB node. In another aspect, the second wireless device is a base station, a user equipment, an additional repeater, or an IAB node.

At 1206, the control node transmits, to the repeater, an indication for an MT component of the repeater to enter a power saving mode, as described in connection with the power saving indication 834 of FIG. 8. The transmitting of the indication, at 1206, may be performed by an indication component 1444 of the apparatus 1402 of FIG. 14.

In some examples, the power saving mode may include reducing monitoring for a control, as described in connection with 840 of FIG. 8. In some examples, the power saving mode may include monitoring for a wake-up signal, as described in connection with the wake-up signal 842. In some examples, the power saving mode may include skipping monitoring for the control signal for a duration of time, as described in connection with 844 of FIG. 8. In some examples, the power saving mode may include using a configured random access resource or a configured scheduling request resource to initiate control communication with the control node over the control link as described in connection with 846 of FIG. 8. In some examples, the power saving mode may include reducing reference signal measurements and/or reducing beam measurements, as described in connection with 848 of FIG. 8. In some examples, the power saving mode may include setting the MT component to an RRC inactive mode or to an RRC idle mode, as described in connection with 838 of FIG. 8.

Figure 13:
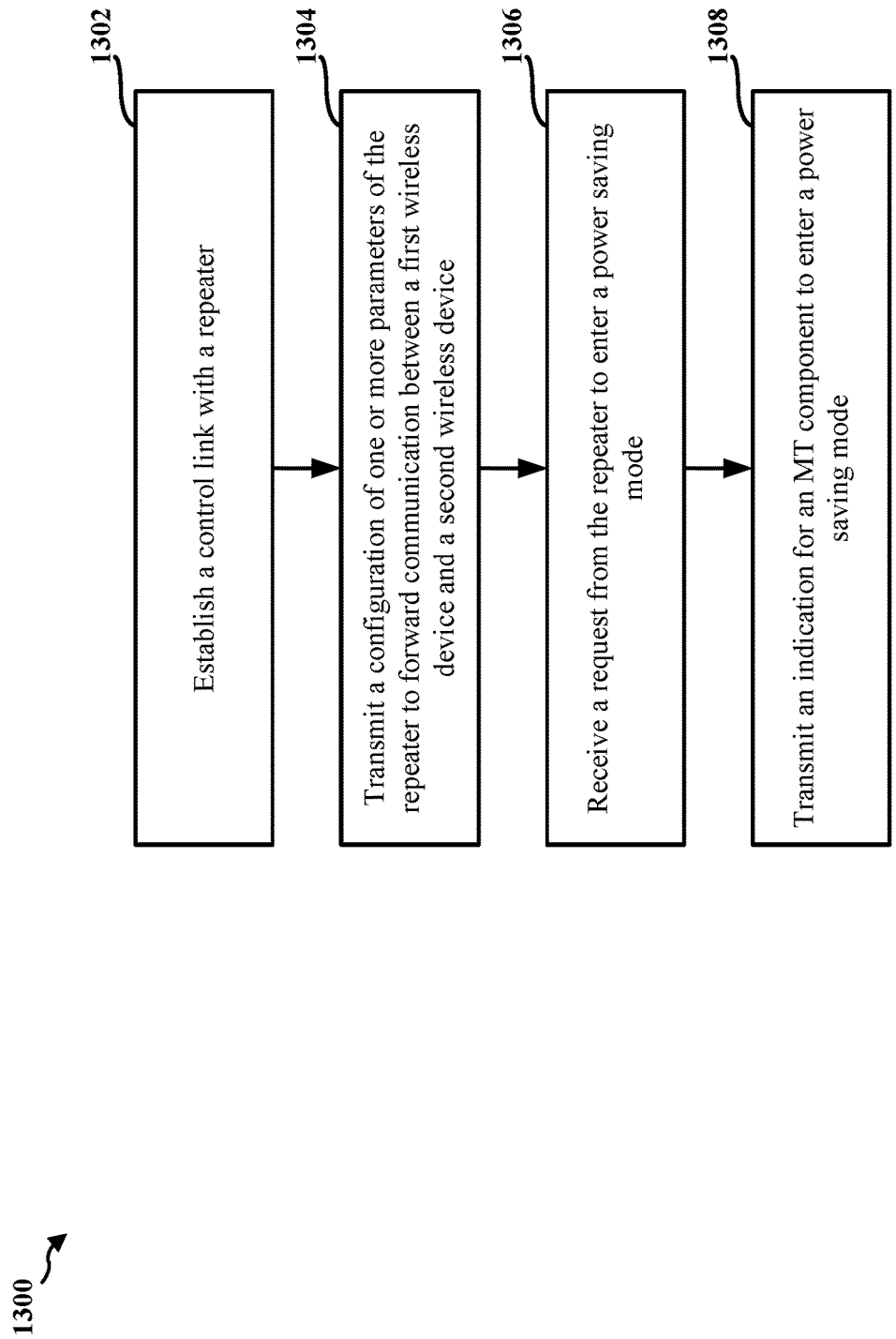
FIG. 13 is a flowchart of a method of wireless communication at a control node, in accordance with the teachings disclosed herein.

FIG. 13 is a flowchart 1300 of a method of wireless communication. The method may be performed by a control node (e.g., a base station 102, 180 of FIG. 1, an IAB node 103 of FIG. 1, the control node 404 of FIG. 4, the control node 802 of FIG. 8, and/or an apparatus 1402 of FIG. 14). The method may facilitate improving power saving at a repeater and/or lower signaling overhead of the control node based on signaling from the control node.

In one aspect, the repeater includes an analog repeater that is configured to receive, amplify, and forward a signal between a first wireless device and a second wireless device.

At 1302, the control node establishes a control link with a repeater, as described in connection with 810 of FIG. 8. In some examples, the control node may establish the control link during the initial access 712 of the front-haul procedures 710 of FIG. 7. In some examples, the control node may transmit control signaling to the repeater over the control link using a same frequency as the communication forwarded by the repeater. In some examples, the control node may transmit control signaling to the repeater over the control link using a different frequency as the communication forwarded by the repeater. In another aspect, the control node may be one of multiple nodes communicating with the repeater. The establishing of the control link with the repeater, at 1302, may be performed by an establishment component 1440 of the apparatus 1402 of FIG. 14.

At 1304, the control node transmits, via the control link, a configuration of one or more parameters of the repeater to forward communication between a first wireless device and a second wireless device, as described in connection with the RU configuration 718 of FIG. 7 and/or the repeater configuration 814 of FIG. 8. The transmitting of the configuration of the one or more parameters, at 1304, may be performed by a configuration component 1442 of the apparatus 1402 of FIG. 14.

In some examples, the one or more parameters may include a beamforming configuration, such as the beamforming configuration 816 of FIG. 8. In some examples, the one or more parameters may include a TDD pattern, such as the TDD pattern 818 of FIG. 8. In some examples, the one or more parameters may include a transmission power configuration, such as the transmission power configuration 820 of FIG. 8. In some examples, the one or more parameters may include a bandwidth configuration, such as the bandwidth configuration 822 of FIG. 8. In some examples, the one or more parameters may include a power saving configuration, such as the power saving configuration 824 of FIG. 8.

In some examples, the configuration may include a periodic configuration of the one or more parameters for at least one of a first link between the repeater and the first wireless device or a second link between the repeater and the second wireless device. In some examples, the configuration may include a semi-static configuration of the one or more parameters, and wherein the repeater applies the semi-static configuration for a period of time.

In one aspect, the first wireless device is a base station, a user equipment, an additional repeater, or an IAB node. In another aspect, the second wireless device is a base station, a user equipment, an additional repeater, or an IAB node.

At 1308, the control node transmits, to the repeater, an indication for an MT component of the repeater to enter a power saving mode, as described in connection with the power saving indication 834 of FIG. 8. The transmitting of the indication, at 1308, may be performed by an indication component 1444 of the apparatus 1402 of FIG. 14.

In some examples, the power saving mode may include reducing monitoring for a control, as described in connection with 840 of FIG. 8. In some examples, the power saving mode may include monitoring for a wake-up signal, as described in connection with the wake-up signal 842. In some examples, the power saving mode may include skipping monitoring for the control signal for a duration of time, as described in connection with 844 of FIG. 8. In some examples, the power saving mode may include using a configured random access resource or a configured scheduling request resource to initiate control communication with the control node over the control link as described in connection with 846 of FIG. 8. In some examples, the power saving mode may include reducing reference signal measurements and/or reducing beam measurements, as described in connection with 848 of FIG. 8. In some examples, the power saving mode may include setting the MT component to an RRC inactive mode or to an RRC idle mode, as described in connection with 838 of FIG. 8.

In some examples, the control node may transmit the indication based on a request from the repeater. For example, 1306, the control node may receive a request from the repeater to enter the power saving mode, as described in connection with the power saving request 832 of FIG. 8. In some examples, the control node may transmit the indication (e.g., at 1308) based on the request from the repeater. The receiving of the request to enter the power saving mode, at 1306, may be performed by request component 1446 of the apparatus 1402 of FIG. 14.

Figure 14:
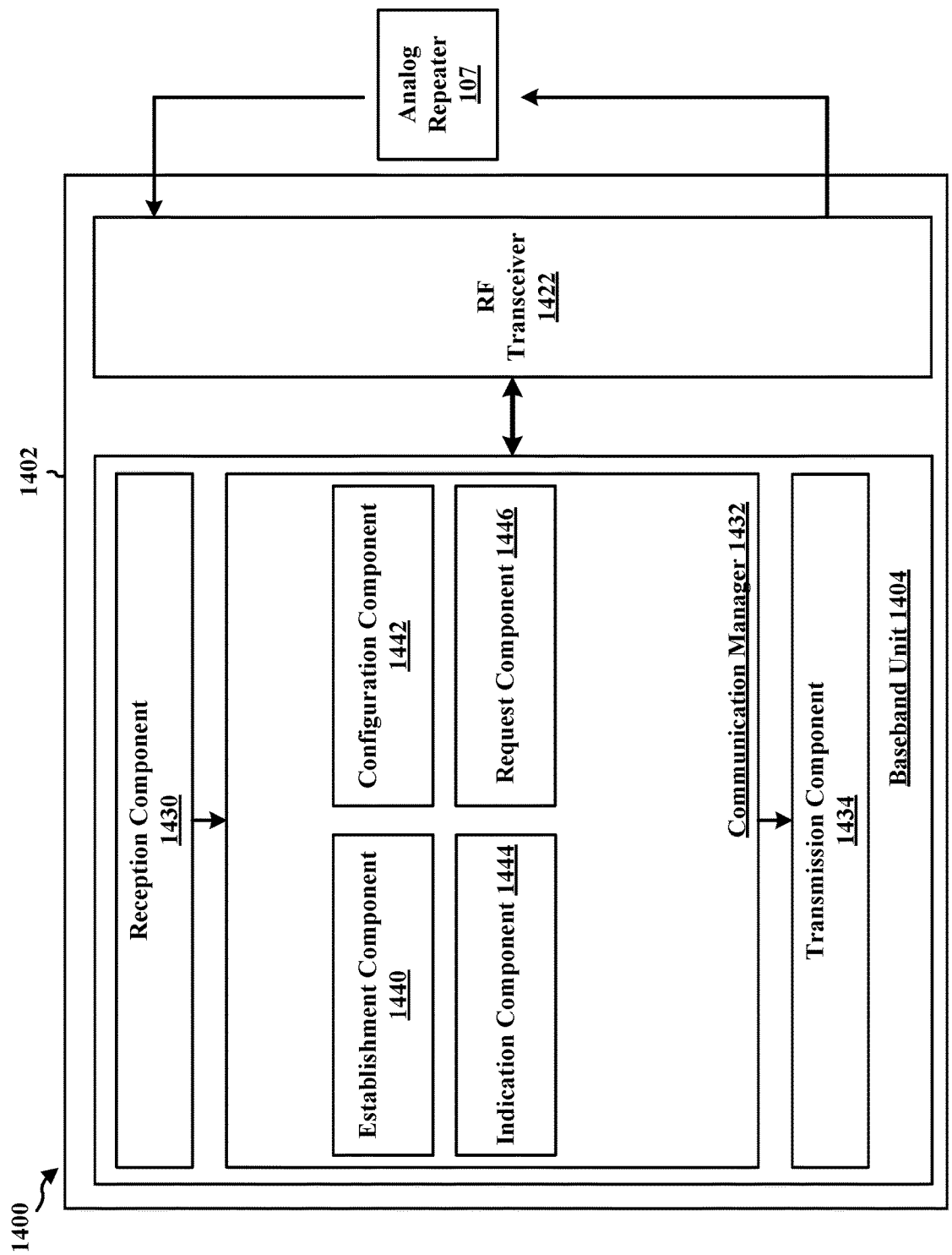
FIG. 14 is a diagram illustrating an example of a hardware implementation for an example apparatus, in accordance with the teachings disclosed herein.

FIG. 14 is a diagram 1400 illustrating an example of a hardware implementation for an apparatus 1402. The apparatus 1402 may be a control node. In some examples, the control node may be a base station or an IAB node. In some aspects, the apparatus 1402 may include a baseband unit 1404. The baseband unit 1404 may communicate through a cellular RF transceiver 1422 with the repeater 107. The baseband unit 1404 may include a computer-readable medium/memory. The baseband unit 1404 is responsible for general processing, including the execution of software stored on the computer-readable medium/memory. The software, when executed by the baseband unit 1404, causes the baseband unit 1404 to perform the various functions described supra. The computer-readable medium/memory may also be used for storing data that is manipulated by the baseband unit 1404 when executing software. The baseband unit 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband unit 1404. The baseband unit 1404 may be a component of the base station 310 and may include the memory 376 and/or at least one of the TX processor 316, the RX processor 370, and the controller/processor 375.

The communication manager 1432 includes an establishment component 1440 that is configured to establish a control link with a repeater, for example, as described in connection with 1202 of FIG. 12 and/or 1302 of FIG. 13.

The communication manager 1432 also includes a configuration component 1442 that is configured to transmit, via the control link, a configuration of one or more parameters of the repeater to forward communication between a first wireless device and a second wireless device, for example, as described in connection with 1204 of FIG. 12 and/or 1304 of FIG. 13.

The communication manager 1432 also includes an indication component 1444 that is configured to transmit, to the repeater, an indication for an MT component to enter a power saving mode, for example, as described in connection with 1206 of FIG. 12 and/or 1308 of FIG. 13.

The communication manager 1432 also includes a request component 1446 that is configured to receive a request from the repeater to enter the power saving mode, wherein the control node transmits the indication based on the request from the repeater, for example, as described in connection with 1306 of FIG. 13.

The apparatus may include additional components that perform each of the blocks of the algorithm in the flowcharts of FIGS. 12 and/or 13. As such, each block in the flowcharts of FIGS. 12 and/or 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the baseband unit 1404, includes means for establishing a control link with a repeater. The example apparatus 1402 also includes means for transmitting, via the control link, a configuration of one or more parameters of the repeater to forward communication between a first wireless device and a second wireless device. The example apparatus 1402 also includes means for transmitting, to the repeater, an indication for an MT component to enter a power saving mode.

In another configuration, the example apparatus 1402 also includes means for receiving a request from the repeater to enter the power saving mode, wherein the control node transmits the indication based on the request from the repeater.

The means may be one or more of the components of the apparatus 1402 configured to perform the functions recited by the means. As described supra, the apparatus 1402 may include the TX processor 316, the RX processor 370, and the controller/processor 375. As such, in one configuration, the means may be the TX processor 316, the RX processor 370, and the controller/processor 375 configured to perform the functions recited by the means.

Aspects disclosed herein provide techniques for improving power saving at a repeater and/or lower signaling overhead of the control node based on signaling from a control node. For example, aspects disclosed herein provide techniques that may enable reduction in the dynamic control signaling between the control node and the repeater to provide power savings for the MT of the repeater and the lower signal overhead for the control node.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a repeater, including: establishing a control link with a control node; receiving, via the control link, a configuration of one or more parameters of the repeater to forward communication between a first wireless device and a second wireless device; transitioning a MT component of the repeater to a power saving mode for at least a period of time after receiving the configuration; and forwarding the communication between the first wireless device and the second wireless device based on the one or more parameters in the configuration Aspect 2 is the method of aspect 1, further including that the one or more parameters includes at least one of: a beamforming configuration, a TDD pattern, a transmission power configuration, a bandwidth configuration, or a power saving configuration.

Aspect 3 is the method of any of aspects 1 and 2, further including that the configuration includes a periodic configuration of the one or more parameters for at least one of a first link between the repeater and the first wireless device or a second link between the repeater and the second wireless device.

Aspect 4 is the method of any of aspects 1 and 2, further including that the configuration includes a semi-static configuration of the one or more parameters, and wherein the repeater applies the semi-static configuration for the period of time.

Aspect 5 is the method of any of aspects 1 to 4, further including that the MT component receives the configuration from the control node via the control link, the method further comprising: receiving, from the control node, an indication for the MT component to enter the power saving mode, wherein the repeater transitions the MT component to the power saving mode based on the indication from the control node.

Aspect 6 is the method of any of aspects 1 to 5, further including that the repeater includes an RU component that forwards the communication between the first wireless device and the second wireless device while the MT component is in the power saving mode.

Aspect 7 is the method of any of aspects 1 to 6, further including that the power saving mode includes one or more of: reducing monitoring for a control signal, monitoring for a wake-up signal, skipping monitoring for the control signal for a duration of time, using a configured random access resource to initiate control communication with the control node over the control link, using a configured scheduling request resource to initiate the control communication with the control node over the control link, reducing reference signal measurement, reducing beam measurement, setting the MT component to an RRC inactive mode, or setting the MT component to an RRC idle mode.

Aspect 8 is the method of any of aspects 1 to 7, further including: transmitting a request to the control node to enter the power saving mode prior to receiving the indication from the control node.

Aspect 9 is the method of any of aspects 1 to 8, further including that the repeater receives control signaling over the control link using a same frequency as the communication forwarded by the repeater.

Aspect 10 is the method of any of aspects 1 to 8, further including that the repeater receives control signaling over the control link using a different frequency as the communication forwarded by the repeater.

Aspect 11 is the method of any of aspects 1 to 10, further including that the control node is one of multiple nodes communicating with the repeater.

Aspect 12 is the method of any of aspects 1 to 11, further including that the first wireless device is a base station, a user equipment, an additional repeater, or an IAB node.

Aspect 13 is the method of any of aspects 1 to 12, further including that the second wireless device is a base station, a user equipment, an additional repeater, or an IAB node.

Aspect 14 is the method of any of aspects 1 to 13, further including that the MT component receives control signaling from the control node using the control link.

Aspect 15 is the method of any of aspects 1 to 14, further including that the repeater comprises an analog repeater that is configured to receive, amplify, and forward a signal between the first wireless device and the second wireless device.

Aspect 16 is an apparatus for wireless communication including at least one processor coupled to a memory and configured to implement any of aspects 1 to 15

Aspect 17 is an apparatus for wireless communication including means for implementing any of aspects 1 to 15.

Aspect 18 is a non-transitory computer-readable storage medium storing computer executable code, where the code, when executed, causes a processor to implement any of aspects 1 to 15.

Aspect 19 is a method of wireless communication at a control node, including: establishing a control link with a repeater; transmitting, via the control link, a configuration of one or more parameters of the repeater to forward communication between a first wireless device and a second wireless device; and transmitting, to the repeater, an indication for an MT component to enter a power saving mode Aspect 20 is the method of aspect 19, further including that the one or more parameters includes at least one of: a beamforming configuration, a TDD pattern, a transmission power configuration, a bandwidth configuration, or a power saving configuration.

Aspect 21 is the method of any of aspects 19 and 20, further including that the control node transmits a periodic configuration of the one or more parameters for at least one of a first link between the repeater and the first wireless device or a second link between the repeater and the second wireless device.

Aspect 22 is the method of any of aspects 19 and 20, further including that the control node transmits a semi-static configuration of the one or more parameters.

Aspect 23 is the method of any of aspects 19 to 22, further including that the power saving mode includes one or more of: reducing monitoring for a control signal, monitoring for a wake-up signal, skipping monitoring for the control signal for a duration of time, using a configured random access resource to initiate control communication with the control node over the control link, using a configured scheduling request resource to initiate the control communication with the control node over the control link, reducing reference signal measurement, reducing beam measurement, setting the MT component to an RRC inactive mode, or setting the MT component to an RRC idle mode.

Aspect 24 is the method of any of aspects 19 to 23, further including: receiving a request from the repeater to enter the power saving mode, wherein the control node transmits the indication based on the request from the repeater.

Aspect 25 is the method of any of aspects 19 to 24, further including that the control node transmits control signaling to the repeater over the control link using a same frequency as the communication forwarded by the repeater.

Aspect 26 is the method of any of aspects 19 to 24, further including that the control node transmits control signaling to the repeater over the control link using a different frequency as the communication forwarded by the repeater.

Aspect 27 is the method of any of aspects 19 to 26, further including that the control node is one of multiple nodes communicating with the repeater.

Aspect 28 is the method of any of aspects 19 to 27, further including that the first wireless device is a base station, a user equipment, an additional repeater, or an IAB node.

Aspect 29 is the method of any of aspects 19 to 28, further including that the second wireless device is a base station, a user equipment, an additional repeater, or an IAB node.

Aspect 30 is an apparatus for wireless communication including at least one processor coupled to a memory and configured to implement any of aspects 19 to 29

Aspect 31 is an apparatus for wireless communication including means for implementing any of aspects 19 to 29.

Aspect 32 is a non-transitory computer-readable storage medium storing computer executable code, where the code, when executed, causes a processor to implement any of aspects 19 to 29.

What is claimed is:

1. An apparatus for wireless communication at a repeater, comprising:
   memory; and
   at least one processor coupled to the memory, the at least one processor configured to:
      establish, by a mobile termination (MT) component of the repeater, a control link with a control node;
      receive, via the control link, a configuration of one or more parameters of a repeating unit (RU) component of the repeater to forward communication between a first wireless device and a second wireless device on an access link;
      transition the MT component to a power saving mode for at least a period of time after receiving the configuration, wherein the MT component is configured to perform reduced monitoring of the control link during the power saving mode; and
      forward, via the RU component, the communication between the first wireless device and the second wireless device on the access link based on the one or more parameters in the configuration while the MT component of the repeater is in the power saving mode.

2. The apparatus of claim 1, wherein the one or more parameters includes at least one of:
   a beamforming configuration,
   a time division duplex (TDD) pattern,
   a transmission power configuration,
   a bandwidth configuration, or
   a power saving configuration.

3. The apparatus of claim 1, wherein the configuration includes a periodic configuration of the one or more parameters for at least one of a first link between the repeater and the first wireless device or a second link between the repeater and the second wireless device.

4. The apparatus of claim 1, wherein the configuration includes a semi-static configuration of the one or more parameters, and wherein the at least one processor is configured to apply the semi-static configuration for the period of time.

5. The apparatus of claim 1, wherein the MT component receives the configuration from the control node via the control link, and the at least one processor is further configured to:
   receive, from the control node, an indication for the MT component to enter the power saving mode, and
   transition the MT component to the power saving mode based on the indication from the control node.

6. The apparatus of claim 5, wherein to facilitate the power saving mode, the at least one processor is configured to at least one of:
   reduce monitoring for a control signal,
   monitor for a wake-up signal,
   skip monitoring for the control signal for a duration of time,
   use a configured random access resource to initiate control communication with the control node over the control link,
   use a configured scheduling request resource to initiate the control communication with the control node over the control link,
   reduce reference signal measurement,
   reduce beam measurement,
   set the MT component to a radio resource control (RRC) inactive mode, or
   set the MT component to an RRC idle mode.

7. The apparatus of claim 5, wherein the at least one processor is further configured to:
   transmit a request to the control node to enter the power saving mode prior to receiving the indication from the control node.

8. The apparatus of claim 1, wherein the at least one processor is configured to:
   receive control signaling over the control link using a same frequency as the communication forwarded by the repeater.

9. The apparatus of claim 1, wherein the at least one processor is configured to:
   receive signaling over the control link using a different frequency as the communication forwarded by the repeater.

10. The apparatus of claim 1, wherein the control node is one of multiple nodes communicating with the repeater.

11. The apparatus of claim 1, wherein the first wireless device is a base station, a user equipment, an additional repeater, or an integrated access and backhaul (IAB) node.

12. The apparatus of claim 1, wherein the second wireless device is a base station, a user equipment, an additional repeater, or an integrated access and backhaul (TAB) node.

13. The apparatus of claim 1, further comprising a transceiver coupled to the at least one processor.

14. The apparatus of claim 1, wherein the repeater comprises the MT component and a receiving unit (RU), and the RU forwards the communication between the first wireless device and the second wireless device while the MT component of the repeater is in the power saving mode.

15. The apparatus of claim 14, wherein the MT component receives control signaling and the RU forwards the communication between the first wireless device and the second wireless device based on the control signaling.

16. A method of wireless communication at a repeater, comprising:

establishing, by a mobile termination (MT) component of the repeater, a control link with a control node;

receiving, via the control link, a configuration of one or more parameters of a repeating unit (RU) component of the repeater to forward communication between a first wireless device and a second wireless device on an access link;

transitioning the MT component to a power saving mode for at least a period of time after receiving the configuration, wherein the MT component is configured to perform reduced monitoring of the control link during the power saving mode; and forwarding, via the RU component, the communication between the first wireless device and the second wireless device on the access link based on the one or more parameters in the configuration while the MT component of the repeater is in the power saving mode.

17. The method of claim 16, wherein the MT component receives the configuration from the control node via the control link, the method further comprising:

receiving, from the control node, an indication for the MT component to enter the power saving mode, wherein the repeater transitions the MT component to the power saving mode based on the indication from the control node.

18. The method of claim 17, wherein the power saving mode includes one or more of:
 reducing monitoring for a control signal,
 monitoring for a wake-up signal,
 skipping monitoring for the control signal for a duration of time,
 using a configured random access resource to initiate control communication with the control node over the control link,
 using a configured scheduling request resource to initiate the control communication with the control node over the control link,
 reducing reference signal measurement,
 reducing beam measurement,
 setting the MT component to a radio resource control (RRC) inactive mode, or
 setting the MT component to an RRC idle mode.

19. The method of claim 17, further comprising:
 transmitting a request to the control node to enter the power saving mode prior to receiving the indication from the control node.

20. The method of claim 16, wherein the repeater comprises the MT component and a receiving unit (RU), and the RU forwards the communication between the first wireless device and the second wireless device while the MT component of the repeater is in the power saving mode.

21. An apparatus for wireless communication at a control node, comprising:
 memory; and
 at least one processor coupled to the memory, the at least one processor configured to:
  establish a control link with a repeater, the repeater comprising a mobile termination (MT) component and a repeating unit (RU);
  transmit, via the control link, a configuration of one or more parameters for the RU of the repeater to forward communication between a first wireless device and a second wireless device on an access link; and
  transmit, to the repeater, an indication for the MT component of the repeater to enter a power saving mode while the RU forwards the communication between the first wireless device and the second wireless device based on the configuration, wherein the MT component is configured to perform reduced monitoring of the control link during the power saving mode.

22. The apparatus of claim 21, wherein the one or more parameters includes at least one of:
 a beamforming configuration,
 a time division duplex (TDD) pattern,
 a transmission power configuration,
 a bandwidth configuration, or
 a power saving configuration.

23. The apparatus of claim 21, wherein the at least one processor is configured to:
 transmit a periodic configuration of the one or more parameters for at least one of a first link between the repeater and the first wireless device or a second link between the repeater and the second wireless device.

24. The apparatus of claim 21, wherein the at least one processor is configured to:
 transmit a semi-static configuration of the one or more parameters.

25. The apparatus of claim 21, wherein to facilitate the power saving mode, the at least one processor is configured to at least one of:
 reduce monitoring for a control signal,
 monitor for a wake-up signal,
 skip monitoring for the control signal for a duration of time,
 use a configured random access resource to initiate control communication with the control node over the control link,
 use a configured scheduling request resource to initiate the control communication with the control node over the control link,
 reduce reference signal measurement,
 reduce beam measurement,
 set the MT component to a radio resource control (RRC) inactive mode, or
 set the MT component to an RRC idle mode.

26. The apparatus of claim 21, wherein the at least one processor is further configured to:
 receive a request from the repeater to enter the power saving mode, wherein the control node transmits the indication based on the request from the repeater.

27. The apparatus of claim 21, wherein the at least one processor is configured to:
 transmit control signaling to the repeater over the control link using a same frequency as the communication forwarded by the repeater.

28. The apparatus of claim 21, wherein the at least one processor is configured to:
 transmit control signaling to the repeater over the control link using a different frequency as the communication forwarded by the repeater.

29. The apparatus of claim 21, wherein the control node is one of multiple nodes communicating with the repeater.

30. The apparatus of claim 21, further comprising a transceiver coupled to the at least one processor.

31. A method of wireless communication at a control node, comprising:
 establishing a control link with a repeater, the repeater comprising a mobile termination (MT) component and a repeating unit (RU);
 transmitting, via the control link, a configuration of one or more parameters of the repeater for the RU of the repeater to forward communication between a first wireless device and a second wireless device on an access link; and transmitting, to the repeater, an indication for the MT component of the repeater to enter a power saving mode while the RU forwards the communication between the first wireless device and the second wireless device based on the configuration, wherein the MT component is configured to perform reduced monitoring of the control link during the power saving mode.

* * * * *